US012593170B2

(12) United States Patent
Huo et al.

(10) Patent No.: US 12,593,170 B2
(45) Date of Patent: Mar. 31, 2026

(54) SWITCHING METHOD FOR AUDIO OUTPUT CHANNEL, AND DISPLAY DEVICE

(71) Applicant: HISENSE VISUAL TECHNOLOGY CO., LTD., Qingdao (CN)

(72) Inventors: Junyi Huo, Qingdao (CN); Dawei Zhang, Qingdao (CN); Qiang Wang, Qingdao (CN); Xing Wang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 290 days.

(21) Appl. No.: 18/486,764

(22) Filed: Oct. 13, 2023

(65) Prior Publication Data

US 2024/0040306 A1 Feb. 1, 2024

Related U.S. Application Data

(63) Continuation of application No. PCT/CN2022/084267, filed on Mar. 31, 2022.

(30) Foreign Application Priority Data

| Apr. 21, 2021 | (CN) | .......................... | 202110429853.7 |
| Apr. 22, 2021 | (CN) | .......................... | 202110436267.5 |
| May 21, 2021 | (CN) | .......................... | 202110560435.1 |

(51) Int. Cl.
*H04R 3/00* (2006.01)
*G06F 3/16* (2006.01)
*H04N 21/439* (2011.01)

(52) U.S. Cl.
CPC .............. *H04R 3/00* (2013.01); *G06F 3/165* (2013.01); *H04N 21/439* (2013.01); *H04R 2420/01* (2013.01); *H04R 2430/01* (2013.01)

(58) Field of Classification Search
CPC .......... G06F 3/165; G06F 3/162; G06F 16/68; G06F 3/0482; G06F 3/167
(Continued)

(56) References Cited

U.S. PATENT DOCUMENTS 11,159,785 B1 * 10/2021 Lin ................... H04N 21/43635
2009/0186583 A1 * 7/2009 Seil ....................... H04B 1/3877
455/66.1
(Continued)

FOREIGN PATENT DOCUMENTS

| CN | 101453619 A | 6/2009 |
| CN | 101841677 A | 9/2010 |

(Continued)

OTHER PUBLICATIONS

First Office Action, Application No. 202110296392.0 dated Jan. 30, 2022.
(Continued)

*Primary Examiner* — Alexander Krzystan
(74) *Attorney, Agent, or Firm* — Meunier Carlin & Curfman LLC

(57) ABSTRACT

Disclosed are a switching method for an audio output channel, and a display apparatus. The method includes: in response to a switch operation for switching an audio output channel of an external power amplifier, obtaining a first state value corresponding to the switch operation, where the audio output channel of the external power amplifier includes an ARC and/or an eARC, and the first state value is used for indicating an on/off state of the eARC specified by the switch operation; and adjusting a connection state of the ARC and a connection state of the eARC according to the first state value, and determining a target channel for (Continued)

outputting audio according to an adjusting result; and displaying the on/off state of the eARC matching with the target channel.

12 Claims, 16 Drawing Sheets

(58) Field of Classification Search
USPC ............................................................ 700/94
See application file for complete search history.

(56) References Cited

U.S. PATENT DOCUMENTS

| | | | | |
|---|---|---|---|---|
| 2016/0364202 A1* | 12/2016 | Ro | ......................... | G06F 3/0482 |
| 2017/0236489 A1 | 8/2017 | Oh | | |
| 2018/0115808 A1* | 4/2018 | Buga | ................ | H04N 21/44213 |
| 2020/0344445 A1 | 10/2020 | Komori et al. | | |
| 2020/0351465 A1* | 11/2020 | Wolff | ...................... | G06F 3/162 |
| 2021/0034322 A1* | 2/2021 | Kim | ......................... | G06F 3/165 |
| 2021/0099278 A1* | 4/2021 | Jean | ...................... | H04L 65/765 |
| 2021/0105530 A1* | 4/2021 | Lassure | .............. | H04N 21/4104 |
| 2023/0082685 A1* | 3/2023 | Chan | ................ | H04N 21/43615 |
| | | | | 725/143 |
| 2023/0319227 A1* | 10/2023 | Huo | ................... | H04N 21/4882 |
| | | | | 348/738 |
| 2024/0040306 A1* | 2/2024 | Huo | ......................... | H04R 3/00 |

FOREIGN PATENT DOCUMENTS

| | | |
|---|---|---|
| CN | 102104804 A | 6/2011 |
| CN | 102695013 A | 9/2012 |
| CN | 102870427 A | 1/2013 |
| CN | 103135806 A | 6/2013 |
| CN | 106803915 A | 6/2017 |
| CN | 107613378 A | 1/2018 |
| CN | 111492648 A | 8/2020 |
| CN | 111782390 A | 10/2020 |
| CN | 111954044 A | 11/2020 |
| CN | 112019782 A | 12/2020 |
| CN | 112218152 A | 1/2021 |
| CN | 113055788 A | 6/2021 |
| CN | 113064645 A | 7/2021 |
| WO | 2012142796 A1 | 10/2012 |

OTHER PUBLICATIONS

International Search Report, PCT/CN2021/134350, Feb. 23, 2022.
Notification of Third Office Action, Application No. 202110560435. 1, Issued Apr. 27, 2023.
Notification of Second Office Action, Application No. 202110560435. 1, Issued Nov. 23, 2022.
Notification of First Office Action, Application No. 202110560435. 1, Issued Jul. 5, 2022.
Notification of Second Office Action, Application No. 202110436267. 5, Issued Nov. 18, 2022.
Notification of First Office Action, Application No. 202110436267. 5, Issued Jun. 22, 2022.
Notification of First Office Action, Application No. 202110429853. 7, Issued Mar. 24, 2022.

* cited by examiner

100

Audio Output

○   TV Speaker

●   ARC

○   Bluetooth

Sound

System Sounds             off ⊂◯ on

Sound Mode
Standard

Audio Output
ARC eARC                    off ◯⊃ on

Dolby Atmos          off ⊂◯ on

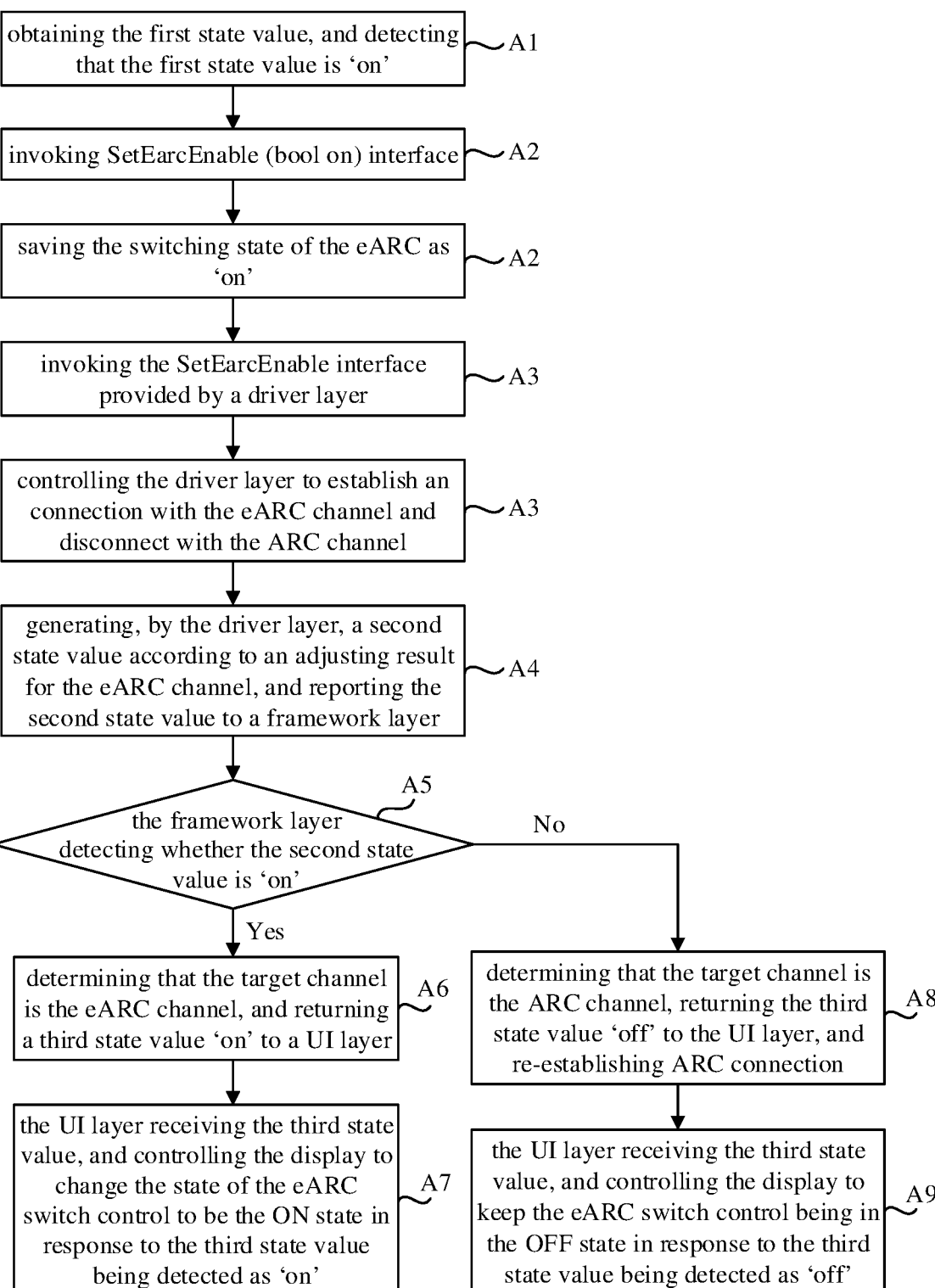

Switch logic 1 in response to the eARC being switched from OFF state to ON state obtaining the first state value, and detecting that the first state value is 'on' — A1 invoking SetEarcEnable (bool on) interface — A2 saving the switching state of the eARC as 'on' — A2 invoking the SetEarcEnable interface provided by a driver layer — A3 controlling the driver layer to establish an connection with the eARC channel and disconnect with the ARC channel — A3 generating, by the driver layer, a second state value according to an adjusting result for the eARC channel, and reporting the second state value to a framework layer — A4

A5
the framework layer detecting whether the second state value is 'on'     No

Yes determining that the target channel is the eARC channel, and returning a third state value 'on' to a UI layer     A6 the UI layer receiving the third state value, and controlling the display to change the state of the eARC switch control to be the ON state in response to the third state value being detected as 'on'     A7 determining that the target channel is the ARC channel, returning the third state value 'off' to the UI layer, and re-establishing ARC connection     A8 the UI layer receiving the third state value, and controlling the display to keep the eARC switch control being in the OFF state in response to the third state value being detected as 'off'     A9

Fig. 8

Switch logic 2 in response to the eARC being switched from
ON state to OFF state

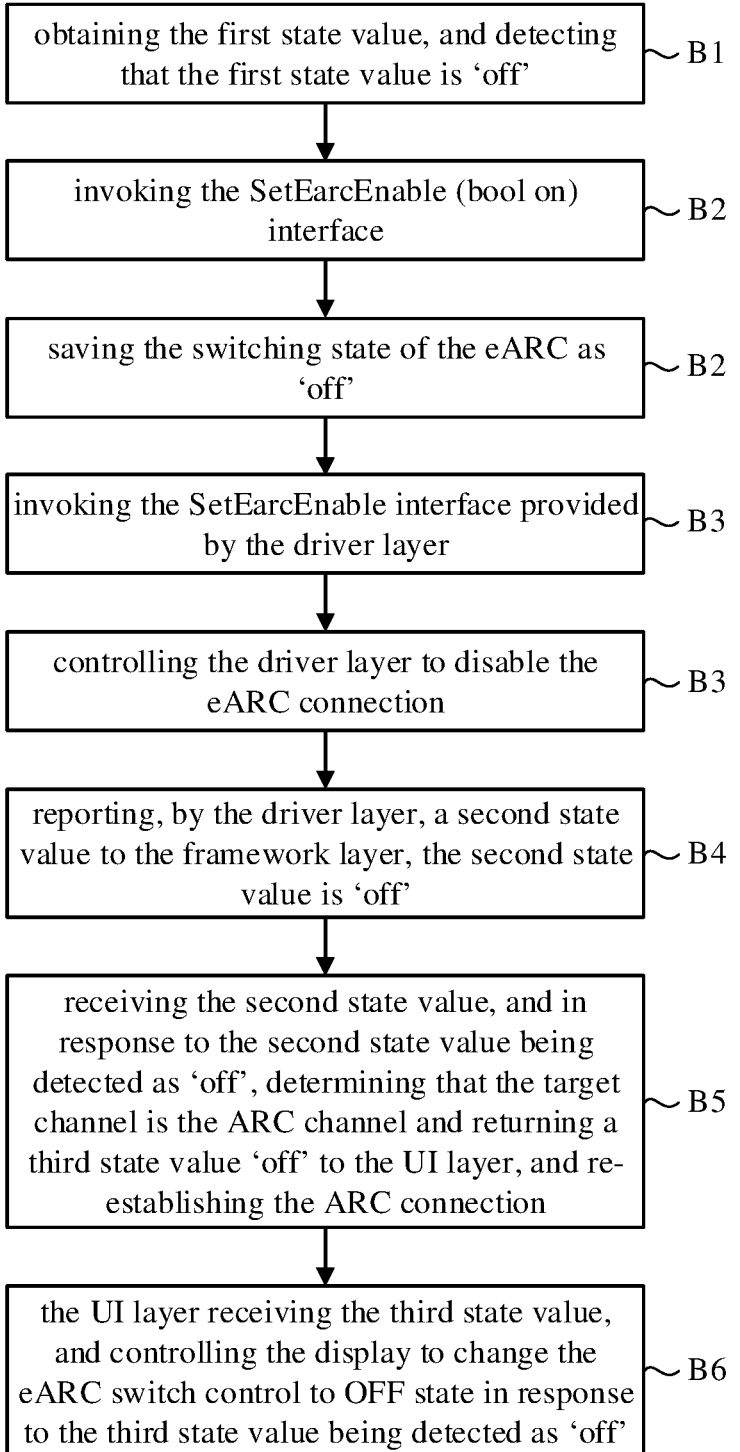

obtaining the first state value, and detecting
that the first state value is 'off'    ∼ B1 invoking the SetEarcEnable (bool on)
interface    ∼ B2 saving the switching state of the eARC as
'off'    ∼ B2 invoking the SetEarcEnable interface provided
by the driver layer    ∼ B3 controlling the driver layer to disable the
eARC connection    ∼ B3 reporting, by the driver layer, a second state
value to the framework layer, the second state    ∼ B4
value is 'off' receiving the second state value, and in
response to the second state value being
detected as 'off', determining that the target
channel is the ARC channel and returning a    ∼ B5
third state value 'off' to the UI layer, and re-
establishing the ARC connection the UI layer receiving the third state value,
and controlling the display to change the
eARC switch control to OFF state in response    ∼ B6
to the third state value being detected as 'off'

Fig. 9

SWITCHING METHOD FOR AUDIO OUTPUT CHANNEL, AND DISPLAY DEVICE

CROSS-REFERENCE TO RELATED APPLICATIONS

This application is a continuation application of International Application No. PCT/CN2022/084267, filed on Mar. 31, 2022, which claims priorities to Chinese Patent Application No. 202110560435.1, filed on May 21, 2021, Chinese Patent Application No. 202110429853.7, filed on Apr. 21, 2021, and Chinese Patent Application No. 202110436267.5, filed on Apr. 22, 2021, all of which are hereby incorporated by reference in their entireties.

TECHNICAL FIELD

The present disclosure relates to the field of display apparatus, and particularly to a switching method for an audio output channel, and a display apparatus.

BACKGROUND

In some scenarios, a display apparatus can be connected with an external power amplifier, such as an audio device and etc., so that an audio output channel is no longer limited to build-in loudspeaker of the display apparatus. For an external power amplifier supporting Audio Return Channel (ARC) and/or enhanced Audio Return Channel (eARC) function, the external power amplifier can be connected with a display apparatus through a High Definition Multimedia Interface, HDMI. The eARC does not only outputs audio formats supported by the ARC, but also supports the latest audio formats, such as Dolby Atmos, DTS:X, multichannel Linear Pulse Code Modulation (LPCM) and etc., so as to improve audio playing effect.

SUMMARY

The present disclosure provides a switching control method for an audio output channel and a display apparatus.

The first aspect of the present disclosure provides a display apparatus, including:

a display configured to present an image and/or a user interface;

one or more HDMI ports, configured to connect with one or more external devices, where the one or more external devices include an external power amplifier, an audio output channel of the external power amplifier includes an Audio Return Channel, ARC and/or an enhanced Audio Return Channel, eARC;

a sound speaker configured to play audio;

a memory configured to store instructions and data associated with the display;

at least one processor in connection with the display, the one or more HDMI ports, the sound speaker and configured to execute the instructions to cause the display apparatus to perform:

in response to a switch operation for switching the audio output channel of the external power amplifier, obtaining a first state value corresponding to the switch operation, where the first state value is used for indicating an ON/OFF state of the eARC specified by the switch operation;

adjusting a connection state of the ARC and a connection state of the eARC according to the first state value, and determining a target channel for outputting audio according to an adjusting result, and displaying the ON/OFF state of the eARC matching with the target channel.

The second aspect of the present disclosure provides a switching method for an audio output channel in a display apparatus, including:

in response to a switch operation for switching the audio output channel of an external power amplifier, obtaining a first state value corresponding to the switch operation, wherein the external power amplifier is connected with the display apparatus through a High-Definition Multimedia Interface, HDMI, the audio output channel of the external power amplifier includes: an Audio Return Channel, ARC and/or an enhanced Audio Return Channel, eARC, the first state value is used for indicating an ON/OFF state of the eARC specified by the switch operation;

adjusting a connection state of the ARC and a connection state of the eARC according to the first state value, and determining a target channel for outputting audio according to an adjusting result, and displaying the ON/OFF state of the eARC matching with the target channel.

BRIEF DESCRIPTION OF FIGURES

FIG. 8 is a schematic diagram of a first switching logic for switching the eARC from OFF state to ON state.

FIG. 9 is a schematic diagram of a second switching logic for switching the eARC from ON state to OFF state.

DETAILED DESCRIPTION

It should be noted that the brief explanation for terms in the present disclosure is merely used for understanding the embodiments better, but not for intending to limit embodiments of the present disclosure. Unless otherwise defined, the terms used in the present disclosure shall have the ordinary meaning as understood by those of ordinary skilled in the art.

Figure 1:
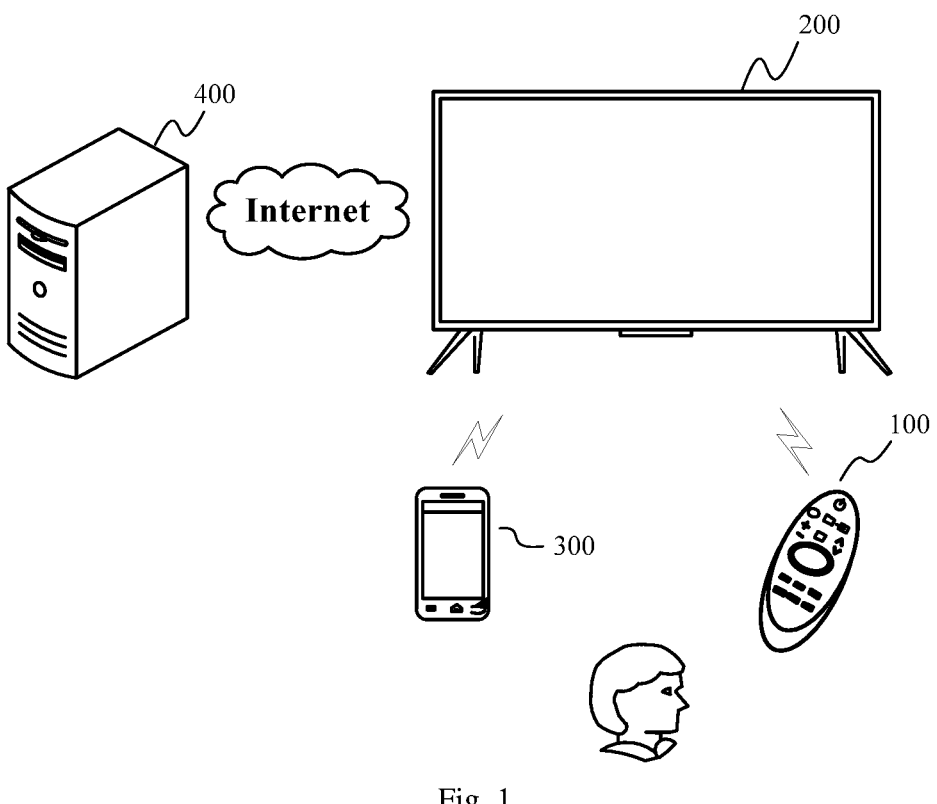
FIG. 1 is a schematic diagram of an application scenario of a display apparatus according to some embodiments.

FIG. 1 illustrates a scenario of a display apparatus according to some embodiments. As shown in FIG. 1, the display apparatus further performs data communication with a server 400. A user can operate the display apparatus through a smart device 300 or a control device 100.

In some embodiments, the control device 100 may be a remote control. A communication between the remote control and the display apparatus includes an infrared protocol communication or a Bluetooth protocol communication, and at least one of other short-distance communications. The display apparatus 200 is controlled through wireless or wired mode. A user can input commands through buttons on the remote control, voice input, or control panel to control the display apparatus 200.

In some embodiments, the smart device 300 may include any one of a mobile terminal, a tablet computer, a PC, a laptop, (Augmented Reality) AR/Virtual Reality (VR) device and etc.

In some embodiments, the smart device 300 can be further used to control the display apparatus 200. For an example, using applications running on the smart device to control the display apparatus 200.

In some embodiments, the smart device 300 can be further used for data communication with the display apparatus.

In some embodiments, the display apparatus 200 can be controlled by other manners besides the control device 100 and the smart device 300. For an example, voice commands from a user can be directly received by a module for obtaining voice instructions. The module is built in the display apparatus. Further, the voice commands from a user can be received by a voice control device provided outside the display apparatus 200.

In some embodiments, the display apparatus 200 also performs data communication with the server 400. The display apparatus 200 is allowed to communicate with other networks through the Local Area Network (LAN) and the Wireless LAN (WLAN). The server 400 can provide various contents to the display apparatus 200 and interact with the display apparatus 200.

Figure 2:
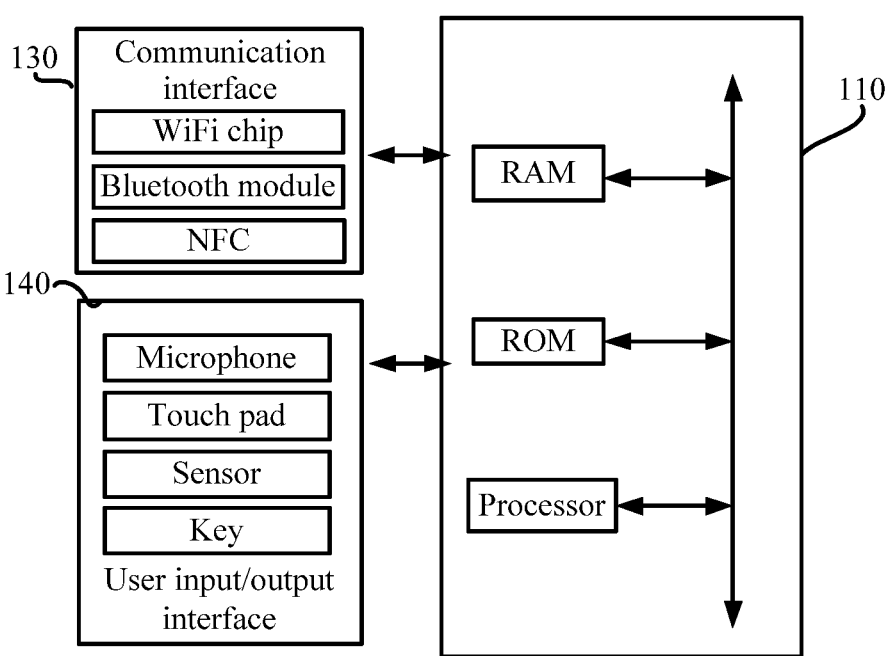
FIG. 2 is a block diagram of hardware configuration of a control device 100 according to some embodiments.

FIG. 2 is a block diagram of configuration of the control device 100 according to some embodiments. As shown in FIG. 2, the control device includes a processor 110, a communication interface 130, a user input/output interface 140, a memory, and a power supply. The control device 100 can receive an input operation command from a user, and convert the operation command into an instruction that can be recognized and responded by the display apparatus 200, playing an intermediary role between the user and the display apparatus 200.

In some embodiments, the communication interface 130 is configured to be in communication with outside. The communication interface 130 includes at least one of a WIFI chip, a Bluetooth module, a Near Field Communication (NFC) module or an alternative module.

In some embodiments, the user input/output interface 140 includes at least one of a microphone, a touch pad, a sensor, a key or an alternative module.

Figure 3:
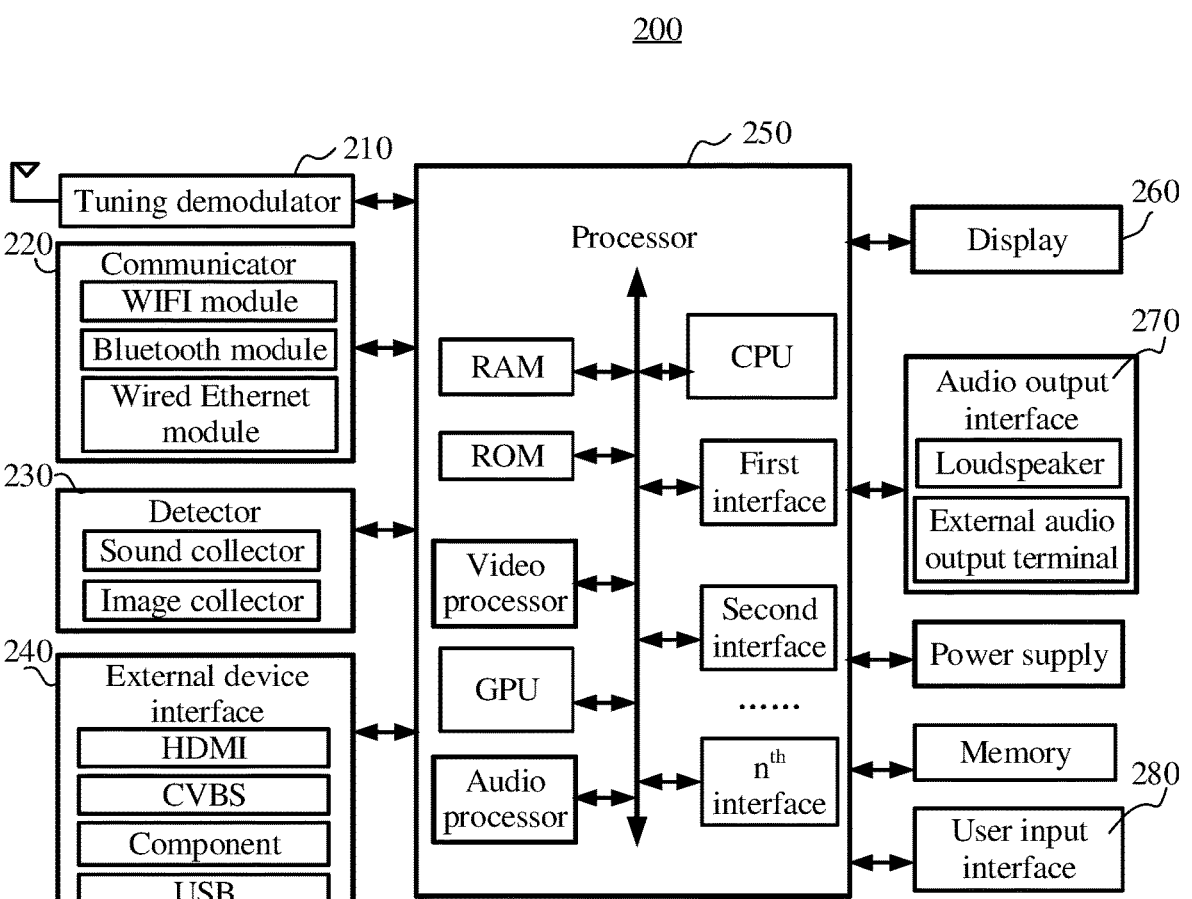
FIG. 3 is a block diagram of hardware configuration of a display apparatus 200 according to some embodiments.

FIG. 3 is a block diagram of hardware configuration of the display apparatus 200 according to some embodiments.

In some embodiments, the display apparatus 200 includes at least one of a tuning demodulator 210, a communicator 220, a detector 230, an external device interface 240, at least one processor 250, a display 260, an audio output interface 270, a memory, a power supply or a user input interface.

In some embodiments, the at least one processor includes a Central Processing Unit (CPU), a video processor, an audio processor, a Graphics Processing Unit (GPU), a Random Access Memory (RAM), a Read Only Memory (ROM), and first to $n^{th}$ interfaces for input/output.

In some embodiments, the display 260 includes a panel component for presenting an image, a driving component for driving image display, a component for receiving an image signal output from the at least one processor, and for presenting video content, image content, a menu operation interface, and a UI for user operation, etc.

In some embodiments, the display 260 can be at least one of a liquid crystal display (LCD), an Organic Light Emitting Diode (OLED) display, or a projection display. The display 260 can be also a projection device and a projection screen.

In some embodiments, the tuning demodulator 210 receives broadcasting television signals through a wired or wireless reception, and demodulates audio-video signals from multiple wireless/wired broadcasting television signals, such as Electronic Program Guide (EPG) data signals.

In some embodiments, the communicator 220 is a component configured to communicate with an external device or a server through various communication protocol types. For an example, the communicator 220 can include at least one of a WIFI module, a Bluetooth module, a wired Ethernet module, other communication protocol chips or a NFC chip, or an infrared receiver. The display apparatus 200 can send and receive control signals and data signals with the control device 100 or the server 400 through the communicator 220.

In some embodiments, the detector 230 is configured to collect external environment signals or signals interacting with the external environment. For an example, the detector 230 includes an optical receiver, a sensor configured to collect an intensity of ambience light. Alternatively, the detector 230 includes an image collector, such as a camera, configured to collect an external environment scenario, user attributes or user interaction gestures. Further alternatively, the detector 230 includes a sound collector, such as a microphone and etc., configured to receive external sound.

In some embodiments, the external device interface 240 can include at least one of but not be limited to: a High-Definition Multimedia Interface (HDMI), an analog/data high-definition component input interface (Component), a Composite Video Broadcast Signal (CVBS) interface, a Universal Serial Bus (USB) interface, or an RGB interface. Further, the external device interface 240 can be a composite input/output interface formed by multiple aforementioned interfaces.

In some embodiments, the processor 250 and the tuning demodulator 210 can be in different independent devices, that is, the tuning demodulator 210 can be in an external device of a primary device in which the control device 250 is located, such as an external set-top box and etc.

In some embodiments, the processor 250 is configured to control the operation of the display apparatus and respond to the user operation through various software control programs stored in the memory. The processor 250 is configured to control the overall operation of the display apparatus 200. For an example, the processor 250 can perform operations corresponding to a selected object in response to a user command for selecting an object presented on the display 260.

In some embodiments, the object can be any one of selected objects, such as a hyperlink, an icon or any other controls available for operation. The operations corresponding to the selected object include displaying a link to a hyperlink page, a document, an image and etc., or launching an application corresponding to the icon.

The CPU is configured to run an operating system and application instructions stored in the memory, and implement various applications, data and contents according to various interaction instructions from external input, so as to finally display and play various audio, video contents. The CPU can include multiple processors, for an example, a main processor and one or more sub-processor.

In some embodiments, the GPU is configured to generate various image objects, such as at least one of icons, operation menus or display graphics for user's input. The GPU includes an arithmetic device for executing operations through receiving various user's interaction instructions, and displaying each object according to a display property. The GPU further includes a renderer for rendering each object obtained by the arithmetic device. The rendered object is presented on the display.

In some embodiments, the video processor is configured to perform at least one of video process of decompressing, decoding, scaling, denoising, frame-rate converting, resolution converting, or image synthesis on received external video signals, so as to obtain signals which can be displayed directly in the display apparatus 200.

In some embodiments, the video processor includes at least one of a demultiplexing module, a video decoding module, an image synthesis module, a frame-rate converting module, or a display formatting module. Here, the demultiplexing module is configured to demultiplex input audio-video data stream. The video decoding module is configured to perform a process, such as decoding, scaling and etc., on the demultiplexed video signals. The image synthesis module, such as an image synthesizer, is configured to superpose and mix GUI signals with the scaled video images to generate image signals for display. The GUI signals is generated by an image generator according to user input, or generated by the image generator. The frame-rate converting module is configured to convert the frame rate of input video signals. The display formatting module is configured to receive the input video signals of which the frame rate is converted, and change the input video signals to meet a display format, for an example, outputting a RGB data signal.

In some embodiments, the audio processor is configured to receive an external audio signal, decompress and decode the external audio signal according to a standard encode/decode protocol for input signals, and perform at least one of denoising, data-analog converting or amplifying etc., to obtain a sound signal that can be played by the loudspeaker.

In some embodiments, the user can input user commands through the GUI displayed on the display 260. Then, the user input interface receives the user commands through the GUI. Alternatively, the user can input user commands through inputting specified voice or gestures. Then, the user input interface receives the user commands through a sensor recognizing the voice or gestures.

In some embodiments, the user interface 280 can be an interface for receiving input, such as physical buttons on the display apparatus and etc.

In some embodiments, a system of the display apparatus can include a Kernel, a shell, a file system, and applications. The Kernel, the shell and the file system form a basic structure of an operating system, and allow a user to manage files, run applications and using the operating system. After being turned on, the Kernel is started, a Kernel space is activated, hardware is abstracted, parameters of the hardware are initialized, and the virtual memory, scheduler, signals and Inter-process Communication (IPC) are run and maintained. After the Kernel being launched, the Shell and user applications are loaded. The applications are compiled as machine codes to form one process after being loaded.

Figure 4:
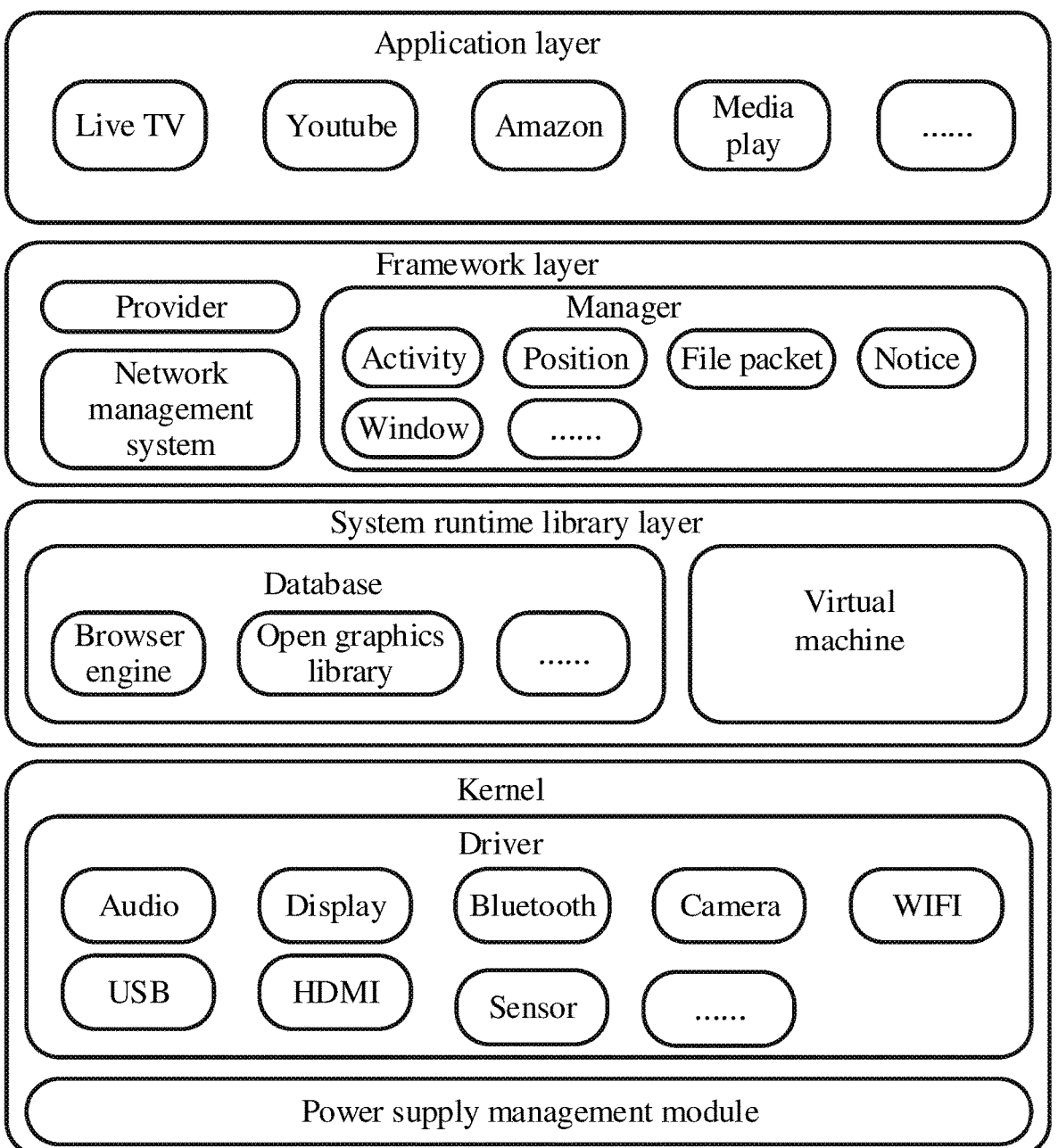
FIG. 4 is a block diagram of software configuration of a display apparatus according to some embodiments.

As shown in FIG. 4, in some embodiments, the system is divided into 4 layers, which are applications layer (application layer for short), application framework layer (framework layer for short), android runtime and system library layer (system runtime library layer for short) and Kernel layer.

In some embodiments, at least one application is run in the applications layer. The applications can be Window applications built in the operating system, system setting applications or clock applications and etc., and can be also applications developed by a third party. In some embodiments, applications in the application layer include but not limit to aforementioned examples.

The framework layer provides the application programming interface (API) and programming frameworks to the applications in the applications layer. The application framework layer includes some predefined functions. The application framework layer corresponds to a processing center which decides actions of applications in the application layer. The applications can access resources of the system and obtain services from the system through the API.

As shown in FIG. 4, the application framework layer according to some embodiments of the present disclosure includes managers, a content provider and etc. The mangers include at least one of an activity manager configured to interact with all running activities, a location manager configured to provide system location service access to the system services or applications, a package manager configured to search various information relating to application packages installed on the device, a notification manager configured to display and remove notification messages, and a window manager configured to manage icons, windows, tool bars, wall papers and desk components on the user interface.

In some embodiments, the activity manager is configured to manage life cycle of an application and normal navigating back functions, such as controlling the functions of exit, open, back of applications, and etc. The window manager is configured to manage all window applications, for examples, obtaining the size of a display window, determining whether there is a status bar, locking screen, capturing screen, controlling a display window to change (e.g. zooming out the display window for display, dithering display, twisted deformation display, etc.).

In some embodiments, the system runtime library supplies supports to a high layer, i.e., the framework layer. When the framework layer is used, the Android operation system runs C/C++ library included in the system runtime library layer to achieve functions of the framework layer.

In some embodiments, the Kernel layer is a layer between hardware and software. As shown in FIG. 4, the Kernel layer includes at least one of drivers: an audio driver, a display driver, a Bluetooth driver, a camera driver, a WIFI driver, a USB driver, an HDMI driver, a sensor driver (such as a fingerprint driver, a temperature sensor, a pressure sensor and etc.), or a power-supply driver, etc.

The aforementioned embodiments discuss the hardware/ software frameworks of the display apparatus, and function realization, etc. In some scenarios, the display apparatus is normally provided with multiple HDMIs through which the display apparatus can be connected with external power amplifiers. The external power amplifiers include an audio device and the likes, which have functions of outputting and playing audio.

In some embodiments, an audio output channel supported by the external power amplifier includes at least one of ARC or eARC. The ARC is dependent on the Consumer Elec-tronics Control (CEC). However, the CEC is not necessary to the eARC.

In some embodiments, if the CEC is in an ON state, the external power amplifiers can support to initiate the ARC or eARC. If the CEC is in an OFF state, the external power amplifiers can only support to initiate the eARC, and the ARC is disabled. The CEC can make a user control multiple external devices enabling CEC through a same remote control. When the CEC is off, although the eARC keeps outputting audio, the user cannot use the remote control to adjust volume of the external power amplifiers, for examples, being unable to mute, increase volume or decrease volume. If the CEC is in the OFF state, and the external power amplifiers only support the ARC and does not support the eARC, the audio cannot be output and played by the external power amplifiers, and it should switch to other channels, such as a TV speaker built in the display apparatus, or a Bluetooth channel, etc.

Figures 5, 6:
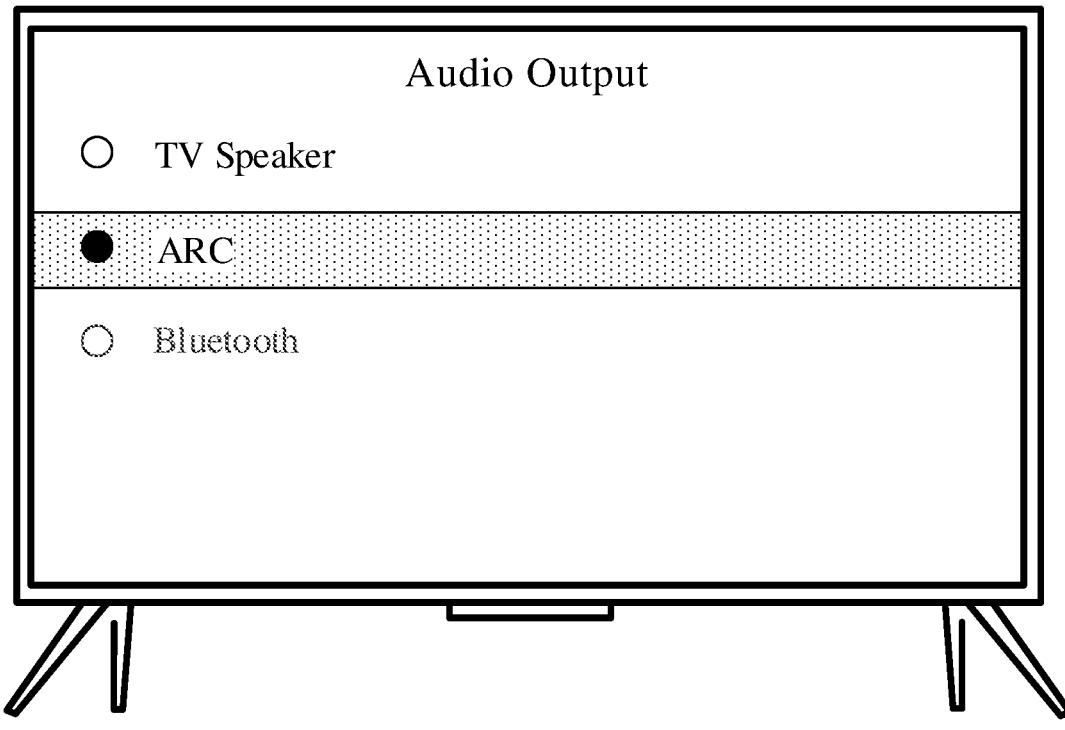
FIG. 5 is a schematic diagram of an UI for a setting page of audio output.
FIG. 6 is a schematic diagram of an UI for switching an ON/OFF state of eARC in a sound setting page.

In some embodiments, FIG. 5 shows a setting page of audio output. The menu of the audio output can present different types of audio output channels, for examples, including but not being limited to TV speaker, ARC and Bluetooth, etc. The menu of audio output can further mark a current state (selectable or non-selectable) of each audio output channel. The channels in the selectable state can be selected by a user, and configured to be a target channel for outputting audio. The channels in the non-selectable state cannot be selected by a user, and cannot act as the target channel to output audio. FIG. 5 illustrates an example of ARC for representing an external power amplifier. However, the name of external power amplifier channel should be synchronized with the actual connection mode of the exter-nal power amplifier.

In some embodiments, the TV speaker is a build-in audio output channel of the display apparatus, and is in a selectable state in default.

In some embodiments, there is a constrain relationship between selectable/non-selectable state of the external power amplifier and the ON/OFF state of the CEC. If the CEC is in the ON state, determining whether A∩B or not, a condition A is that the external power amplifier is detected to be in a connected state through the CEC; a condition B is in that the external power amplifier is connected with a target port. The target port is the ARC port of the display apparatus and/or eARC port of the display apparatus. The condition A means detecting whether the external power amplifier is online, which can be implemented by obtaining device information of the external power amplifier through the CEC. The condition B means determining whether the external power amplifier is connected via the ARC port and/or eARC port. For an example, reading a physical address of the external power amplifier and right shifting the physical address for 12 bits, and comparing the shifted physical address with an address of the target port; if both addresses match with each other, it indicates that the con-nection between the external power amplifier and the target port has been established. Only if A∩B is satisfied, that is, the condition A and the condition B are both met, the external power amplifier in the menu of the audio output is in the selectable state. If A̅∪B̅ is satisfied, that is, one of the condition A and the condition B is not satisfied, the external power amplifier in the menu of the audio output is in the non-selectable state.

In some embodiments, a user can set up the ON/OFF state of the CEC. If the user turns off the CEC, the display apparatus cannot detect through the CEC protocol whether the external power amplifier is connected. In this case, the external power amplifier in the menu of the audio output is set to be in the selectable state in default in the present disclosure, so as to be compatible with the external power amplifier only supporting the eARC, since the eARC is not dependent on the CEC, and can be still maintained even if the CEC is off. This configuration balances automatic rec-ognition for ARC and a technology implementation of the eARC independent from CEC.

In some embodiments, only if the external power ampli-fier in the menu of the audio output is in the selectable state, and the external power amplifier is selected by the user, bidirectional switching can be implemented between the ARC and eARC. FIG. 6 shows a sound setting page. The sound setting page displays that the current target channel for outputting audio is the ARC (i.e., external power ampli-fier), and displays an eARC switch control. The ON/OFF state of eARC can be adjusted by setting the eARC switch control to be ON or OFF.

In some embodiments, if the external power amplifier supports the eARC and ARC both, and the ARC is activated in the display apparatus, the eARC switch control is in OFF state after entering the sound setting page. The user can switch the state of the eARC switch control to ON, so that the audio output channel is switched to the eARC from the ARC; otherwise, if the eARC is activated in the display apparatus, the target channel is displayed as the eARC, the state of the eARC switch control is ON after entering the sound setting page, and the user can switch the state of eARC switch control to OFF, so that the audio channel is switched to the ARC from the eARC.

In some embodiments, if the external power amplifier only supports the ARC, and does not support the eARC, the target channel is displayed as the ARC and the state of the eARC switch control is OFF after entering the sound setting page. Even if an operation is input for turning on the eARC switch control, the ON/OFF state of the eARC switch control cannot be changed as the display apparatus detects that the external power amplifier does not support the eARC. In other words, the working mode of the external power amplifier cannot be switched, and is kept as the ARC.

In some embodiments, if the external power amplifier only supports the eARC, and does not support the ARC, the target channel is displayed as the eARC and the eARC switch control is synchronized as the ON state after a user entering the sound setting page. If the user switches the eARC switch control to be the OFF state, the eARC of the external power amplifier is exited, so that the target channel for outputting audio can be automatically switched to the TV speaker, or the user returns to the menu of the audio output and reselects the target channel for outputting audio.

Figure 7:
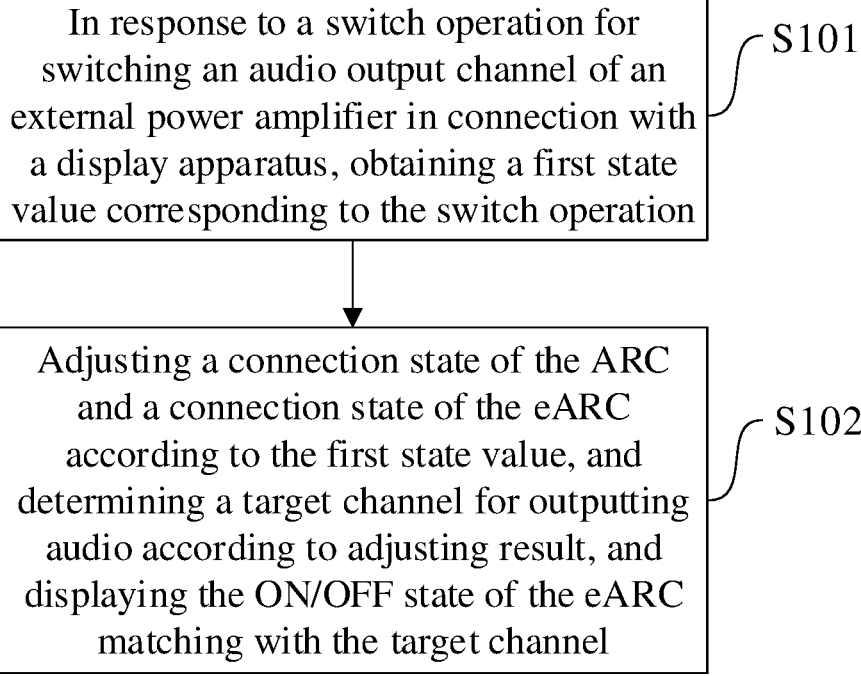
FIG. 7 is a flow chart of a switching control method for an audio output channel.

In some embodiments, after a user selecting the external power amplifier to output audio on the page as shown in FIG. 5, if the user turns on or turns off the eARC switch control on the page as shown in FIG. 6, a switching logic of the ARC and the eARC can be triggered. FIG. 7 shows a switching control method for an audio output channel. The method is implemented by a processor 250. The method includes following steps.

Step S101: in response to a switch operation for switching an audio output channel of an external power amplifier in connection with a display apparatus, obtaining a first state value corresponding to the switch operation, the first state value is used for indicating an ON/OFF state of the eARC specified by the switch operation.

The switch operation in the S101 is an operation for switching an ON/OFF state of the eARC switch control, and includes two cases: one is for switching the eARC switch control from the OFF state to the ON state; and the other one is for switching the eARC switch control from the ON state to the OFF state.

In some embodiments, if the switch operation is for switching the eARC switch control from the OFF state to the ON state, that is, the user expects to activate the eARC, the first state value is denoted as 'on'; if the switch operation is for switching the eARC switch control from the ON state to the OFF state, the first state value is denoted as 'off'. It should be noted that the marking form for the first state value is not limited to the above, in other embodiments, the first state value can also in other form.

Step S102: adjusting a connection state of the ARC and a connection state of the eARC according to the first state value, and determining a target channel for outputting audio according to adjusting result, and displaying the ON/OFF state of the eARC matching with the target channel.

FIG. 7 illustrates a scheme of the switching control logic for the audio output channel. More specific, referring to the first state value in different situations of the S101, a switching logic of the S102 can include a switching logic 1 and a switching logic 2.

FIG. 8 shows the switching logic 1 corresponding to the first state value 'on', including following steps.

Step (A1): obtaining the first state value, and detecting that the first state value is 'on'.

Step (A2): invoking SetEarcEnable (bool on) interface, and saving the switching state of the eARC as 'on'.

Step (A3): invoking the SetEarcEnable interface provided by a driver layer, controlling the driver layer to establish an connection with the eARC channel and disconnect with the ARC channel, so that the driver layer actively makes a handshake with the external power amplifier to connect with the eARC channel, cause the eARC channel to enter Enable state, and to disconnect with the ARC channel, cause the ARCchanel to enter into Disable state; this step adjusts the connection state of the eARC channel and the connection state of the ARC channel according to indication of the first state value.

Step (A4): generating, by the driver layer, a second state value according to an adjusting result for the eARC channel, and reporting the second state value to a framework layer so as to make the framework layer implement a channel-switch control logic as following; in some embodiments, if the driver layer succeeds to establish connection with the eARC channel and enables the eARC channel, returning the second state value 'on'; if some exceptions, such as eARC connection failure, eARC connection timeout, or detecting that the external power amplifier does not support the eARC actually while trying to establish connection with the eARC channel, occur in the driver layer, returning the second state value 'off'.

Step (A5): the framework layer: detecting whether the second state value is 'on', if the second state value is 'on', flowing to Step (A6); if the second state value is 'off', flowing to Step (A8).

Step (A6): the framework layer: determining that the target channel is the eARC channel, and returning a third state value 'on' to a UI layer; the third state value is used for indicating the ON/OFF state of the eARC switch control displayed on the UI layer.

Step (A7): UI layer: receiving the third state value, and controlling the display to change the state of the eARC switch control to be the ON state in response to the third state value being detected as 'on'; in some embodiments, when the UI layer detects that the third state value is 'on', the name of the target channel of the current output audio in the menu of the audio output and the sound setting page is changed to eARC channel, so as to realize a switching from the ARC to the eARC.

Step (A8): the frame work layer: determining that the target channel is the ARC channel, returning the third state value 'off' to the UI layer, and re-establishing ARC connection.

Step (A9): the UI layer: receiving the third state value, and controlling the display to keep the eARC switch control being in the OFF state in response to the third state value being detected as 'off'.

When the eARC connection failure, eARC connection timeout, or detecting that the external power amplifier does not support the eARC, occur in the driver layer, the display apparatus cannot play audio through eARC channel, thus re-initiating ARC handshake, establishing ARC connection and enabling the ARC channel. In the UI layer, the eARC switch control still maintains the OFF state, and cannot be changed along with the user's operation of initiating the eARC, that is, the eARC switch control does not respond to the user's operation of initiating the eARC, so as to avoid a situation where the eARC connection is failed (false connection) in fact but the eARC switch control is displayed as an ON state. In this case, the ARC is used for outputting audio, that is, a channel mode of the external power amplifier is not switched. The driver layer, the framework layer and the UI layer mentioned in the present disclosure are under the control of the processor 250. The processor 250 implements the switching process of the audio output channel through cooperation among the layers.

FIG. 9 shows the switching logic 2 corresponding to the first state value 'off'. The switching logic 2 includes following steps.

Step (B1): obtaining the first state value, and detecting that the first state value is 'off'.

Step (B2): invoking the SetEarcEnable (bool on) interface, saving the switching state of the eARC as 'off'.

Step (B3): invoking the SetEarcEnable interface provided by the driver layer, controlling the driver layer to disable the eARC connection, that is, exiting from the eARC mode of the external power amplifier.

Step (B4): reporting, by the driver layer, a second state value to the framework layer, so that the frame work layer implements the channel switching control logic shown in following Step (B5), the second state value is 'off' in the switching logic 2.

Step (B5): the framework layer: receiving the second state value, and in response to the second state value being detected as 'off', determining that the target channel is the ARC channel and returning a third state value 'off' to the UI layer, and re-establishing ARC connection; the third state value is used for indicating the ON/OFF state of the eARC switch control displayed on the UI layer.

Step (B6): the UI layer: receiving the third state value, and in response to the third state value being detected as 'off', controlling the display to change the eARC switch control to OFF state; in some embodiments, when the UI layer detects that the third state value is 'off', the name of the target channel of the current output audio in the menu of the audio output and the sound setting page is changed to be ARC, so as to realize a switching from the eARC to the ARC.

The aforementioned embodiments relates to schemes in which the CEC is in an ON state in default. In the actual application, the user can operate the CEC switch control in the setting menu so as to control the ON/OFF state of the CEC. When the CEC switch control is switched from ON to OFF, that is, the CEC is switched from the ON state to the OFF state, the sound from the external power amplifier will be interrupted for an instant, and after the CEC is turned off, the user cannot adjust volume by using a remote control in the eARC, but there is no any prompt for this exception. If the user does not use the remote control to adjust volume, the user cannot know this exception. When the user uses the remote control, the user cannot know the reason why the volume cannot be adjusted, resulting in poor user experience.

Figure 10:
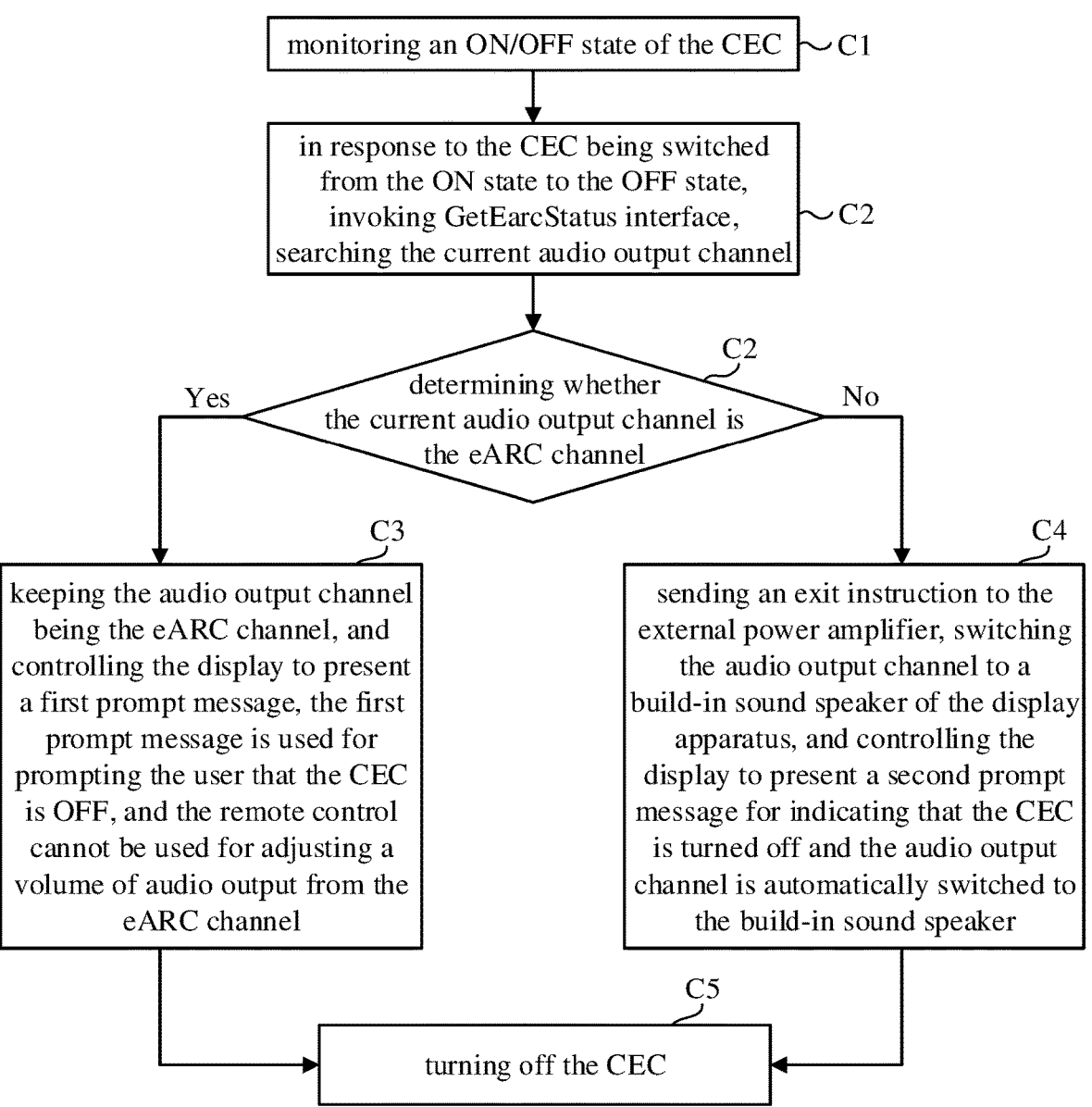
FIG. 10 is a schematic diagram of a third switching logic for switching the CEC from ON state to OFF state.

For this, in some embodiments, FIG. 10 shows a switching logic 3 in a case that the CEC is turned off. The switching logic 3 includes following steps.

Step (C1): monitoring an ON/OFF state of the CEC.

Step (C2): in response to the CEC being switched from the ON state to the OFF state, invoking GetEarcStatus interface, searching the current audio output channel, and determining whether the current audio output channel is eARC channel, if the current audio output channel is the eARC channel, flowing to Step (C3), if the current audio output channel is the ARC channel, flowing to Step (C4).

Step (C3): keeping the audio output channel being the eARC channel, and controlling the display to present a first prompt message, the first prompt message is used for prompting the user that the CEC is OFF, and the remote control cannot be used for adjusting a volume of audio output from the eARC channel.

The eARC does not depend on the CEC, if the CEC is turned off when the external power amplifier is in the eARC mode, it is not necessary to switch the audio output channel, and the eARC channel is kept used for outputting audio, but it is necessary to prompt the user that the remote control cannot be used for adjusting volume of the external power amplifier since the CEC is off. The operations for adjusting volume include mute, volume up and volume down. After the user seeing the first prompt message, the use can know the reason why the remote control cannot adjust the volume of the external power amplifier, so as to restore volume adjusting ability of the remote control through switching the audio output channel, or re-start the CEC, etc.

Step (C4): sending an exit instruction to the external power amplifier, switching the audio output channel to a build-in sound speaker of the display apparatus, and controlling the display to present a second prompt message for indicating that the CEC is turned off and the audio output channel is automatically switched to the build-in sound speaker; the exit instruction is used for instructing the external power amplifier to exit from ARC work mode.

In some embodiments, in Step (C4), upon sending the exit instruction, it is necessary to broadcast a message for indicating the CEC being turned off. In response to receiving the message for indicating the CEC being turned off, an audio device management module in an underlying layer of the display apparatus automatically switches the audio output channel to the TV speaker. In Step (C3), there is no need to broadcast the message for indicating the CEC being turned off, since the audio output channel is not switched and kept being the eARC. The audio device management module does not receive the message for indicating the CEC being turned off, so the audio output channel is not switched.

Step (C5): turning off the CEC. After the Step (C3) or Step (C4) is performed, the CEC can be turned off, and the CEC relevant data can be released.

The ARC depends on the CEC, if the CEC is turned off when the external power amplifier is in the ARC mode, the ARC cannot be used. The display apparatus sends an exit instruction to instruct the external power amplifier to exit from the ARC mode, so as to disable the ARC connection, meanwhile, the display apparatus switches the audio output channel to the TV speaker automatically, that is, to the build-in speaker of the TV to play audio, thereby avoiding no sound problem that occurs when audio cannot be output caused by turning off of the CEC, and prompting the user that the CEC is turned off, and automatically switched to the TV speaker to output sound. The user can know the reason why the audio output channel is switched after watching the second prompt message, and can continuously use the TV speaker to play audio, and also can re-start the CEC to switch to the ARC or eARC of the external power amplifier to output audio.

The present disclosure discusses how to make a switch between ARC and eARC when the external power amplifier is selected from the menu of the audio output channel to play audio, and provides the switching logic 1 and switching logic 2 according to switching directions, thereby improving the accuracy of switching between ARC and eARC. Further, no matter whether a switch between the ARC and the eARC is successfully done, a target channel is matched to output audio, thereby avoiding no sound problem in the external power amplifier and the display apparatus caused by switch failure, guaranteeing the available audio play, improving user experience. The present disclosure is compatible with an external power amplifier supporting both ARC and eARC, and is also compatible with an external power amplifier only supporting one of ARC and eARC.

The external power amplifier may be affected by an ON/OFF state of the CEC when the external power amplifier plays audio in different modes. For this, the switching logic 3 is provided for the case of the CEC being switched from the ON state to the OFF state. It should be noted that more possible switching logics can be adaptively extended based on the switching logics according to the present disclosure and working mechanism of HDMI, CEC, ARC and eARC. The related art can be referred to other contents of HDMI, CEC, ARC and eARC, so the detailed description about them is not repeated herein. Further, the UI in embodiments of the present disclosure is only an example, and is not used to limit the present disclosure.

Currently, the ARC power amplifier of HDMI is widely used on the display apparatus 200 due to the prominent audio play effect of the ARC power amplifier. However, if a user controls the volume key continuously by a remote control, for examples, when the user presses and holds a volume key '+' and a volume key '−', the remote control may send excessive volume-key messages to the display apparatus 200. If the excessive volume-key messages are sent from the remote control, the display apparatus 200 processes multiple volume-key messages once, which may cause discontinuous changes such as sudden changes or jumps in the volume, or the display apparatus 200 always processes the volume-key messages, which causes other control messages not to be processed in time.

Some embodiments of the present disclosure provide a display apparatus 200, which deals with suddenly changed volume and process delay for other control messages caused by the user pressing and holding the volume key on the remote control and other control devices 100.

Figure 11:
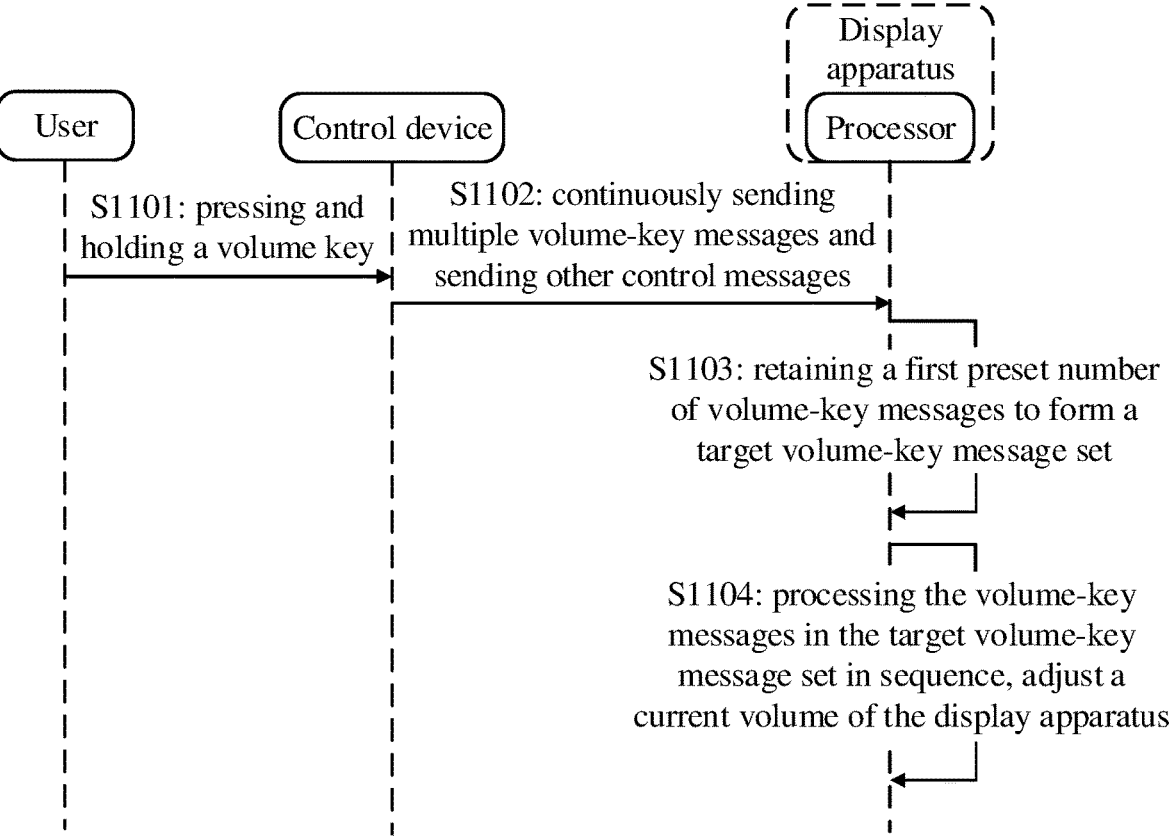
FIG. 11 is a schematic diagram of processing volume-key messages in the display apparatus 200 according to some embodiments.

The user can control the volume of the display apparatus 200 through a volume key of the remote control and other control devices 100 according to requirements of the user. The volume adjustment generated by short pressing the volume key may not satisfy the user's requirement. For this, the user can choose pressing and holding the volume key. As shown in FIG. 11, when the user presses and holds a volume key (S1101), the control device 100 needs to send multiple volume-key messages continuously to the display apparatus, and the control device 100 may send other control messages (S1102), such as direction-key messages, confirmation-key messages, function-key messages or other CEC messages, to the display apparatus 200, during pressing and holding the volume key by the user. When the control messages sent from the control device 100 are excessive, the display apparatus 200 can only retain and process some of volume-key messages generated within a time of one pressing and holding in order to avoid handling excessive volume-key messages by the display apparatus 200, and the display apparatus 200 may not adjust the final volume too high in order to avoid changing volume suddenly.

A Consumer Electronics Control, CEC message is a message transmitted between the control device 100 and the display apparatus 200 based on CEC protocol. The peripherals connected via HDMI ports of the display apparatus 200 can be controlled by one control device 100, by means of CEC messages in general. In some embodiments of the present disclosure, messages mainly used for processing the CEC messages sent from the control device 100 to the display apparatus 200, are also called as control messages. The CEC messages include some key messages sent from the control device and control messages of other forms. The key messages further include volume-key messages and other key messages.

During processing the volume-key messages, the processor 250 of the display apparatus 200 can be configured to receive all control messages sent from the control device 100 within a preset time, the control messages include volume-key messages and other control messages, and the preset time is used for indicating a time of a user pressing a volume key of the control device 100, that is, a time of the user pressing and holding the volume key. Then, the processor 250 retains a first number of volume-key messages in all the control messages to form a target volume-key message set (S1103). Finally, the processor 250 processes the volume-key messages in the target volume-key message set, and adjust a current volume of the display apparatus 200 (S1104).

In some embodiments of the present disclosure, the volume-key messages represent key messages sent from the user pressing and holding a volume key '+' or '−' on the control device 100. In some embodiments, the preset time is used for indicating a time of the user pressing and holding the volume key, such as 2 s, 3 s and etc.

Figure 12:
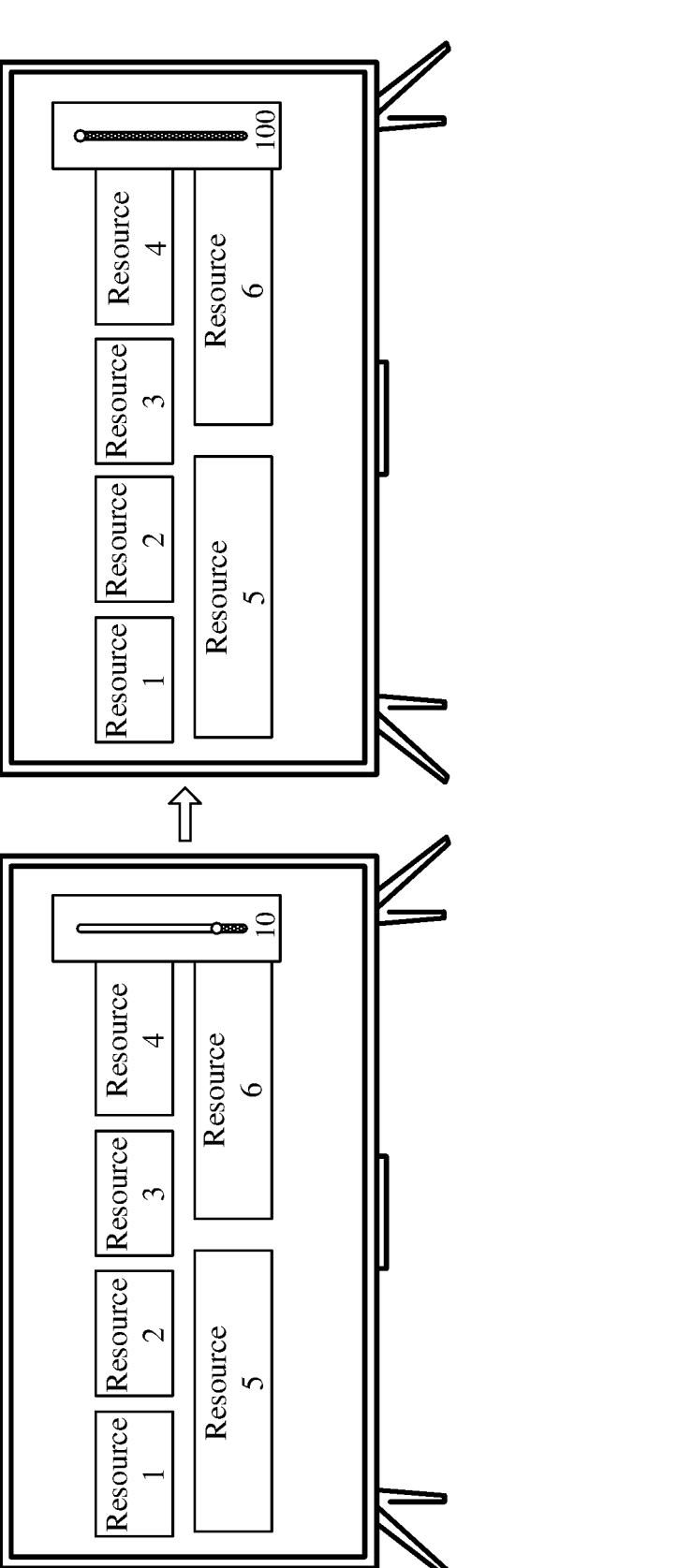
FIG. 12 is a schematic diagram of the display apparatus 200 having a sudden volume change according to some embodiments.

FIG. 12 is a schematic diagram of a sudden volume change in the display apparatus in some embodiments. As shown in FIG. 12, if a user wants to increase the volume of the display apparatus 200 at one time, and the user does not know how long the volume key should be pressed and held for the target volume, the user may presses and holds the volume key for excessive time, that is, the preset time is much longer. The control device 100 may sent excessive volume-key messages and other control messages to the display apparatus 200. The display apparatus 200 may adjust the volume to the maximum according to the user's command after processing all the volume-key messages in sequence, and the maximum volume value must affect the current use experience of the user.

Figure 13:
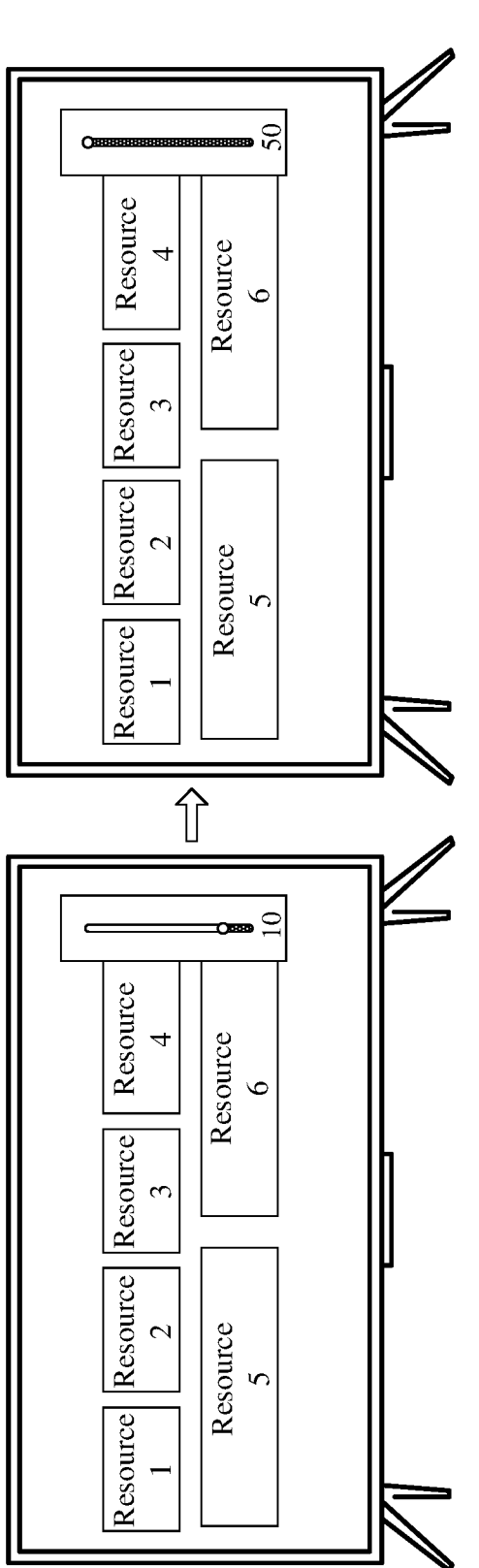
FIG. 13 is a schematic diagram of volume adjustment in the display apparatus 200 according to some embodiments.

FIG. 13 is a schematic diagram of volume adjustment in the display apparatus according to some embodiments. As shown in FIG. 13, when the control device 100 sends excessive volume-key messages, the display apparatus according to some embodiments of the present disclosure only retains and processes some of the volume-key messages, so that the volume is not adjusted too much finally, unlike shown in FIG. 12.

Therefore, the display apparatus 200 according to some embodiments of the present disclosure can avoid the volume being changed suddenly due to processing excessive volume-key messages, and avoid a problem of other control messages not being processed in time due to processing excessive volume-key messages.

Further, according to aforementioned embodiments, the display apparatus may receive other control messages during receiving the volume-key messages, that is, some other control messages are interspersed in the volume-key messages at times, and these messages need to be processed by the display apparatus 200 in sequence. The display apparatus 200 assigns one message processing thread to process these messages one by one according to the processing capacity of CEC bus, since these control messages sent from the control device 100 are CEC messages. The more the volume-key messages are, the longer the occupation time of message processing thread or the CEC bus is, thereby other CEC messages cannot be processed in time.

In some embodiments of the present disclosure, only some of volume-key messages are retained to be processed, further reducing the time consumed by the display apparatus 200 for processing the volume-key messages, so as to increase the speed of the display apparatus 200 for processing other CEC messages. In some embodiments, the display apparatus 200 can determine how many volume-key messages should be retained to be processed according to a rate of sending volume-key messages from the control device 100, that is, determining the first preset number of the volume-key messages. The greater the rate is, the more the number of volume-key messages sent from the control device 100 in a time unit is. In this case, a relative small number of volume-key messages can be selected to be processed. The less the rate is, the less the number of volume-key messages sent from the control device 100 in a time unit is. In this case, an appropriate number of volume-key messages can be selected to be processed, or all volume-key messages can be selected to be processed. Further, the preset time in some embodiments of the present application may include at least one time unit, and the first preset number can be also determined according to the length of the preset time. In some embodiments, the time unit can be set in seconds.

For an example, the rate of sending volume-key messages from the control device 100 is 50 messages per second, and the display apparatus 200 only selects 10 volume-key messages per second to process, and the rest of volume-key messages are discarded. If the preset time is three seconds, and includes three time units, then the first preset number is thirty. Alternatively, if the preset time is one second, the first preset number is ten.

If the preset time only includes one time unit, the display apparatus 200 only needs to process the first ten of all volume-key messages within the time unit, and the rest of volume-key messages are discarded. If the preset time includes three time units, the display apparatus needs to process the first ten of all volume-key messaged within each of the three time units, and the rest of volume-key messages in the three time units are also discarded.

In some embodiments of the present disclosure, the display apparatus 200 needs to first completely process the first preset number of volume-key messages within the preset time, and then continue to process other CEC messages received within the preset time in sequence.

In some embodiments, the processor 250 of the display apparatus 200 can be configured to detect a sending rate of the control device 100 sending the volume-key messages to the display apparatus 200, and determine the first preset number of retained volume-key messages according to the sending rate. In some embodiments, the display apparatus 200 processes the volume-key messages through a series of codes. During processing, an initial message queue and a temporary message queue can be declared in the display apparatus 200. The initial message queue is used for storing all control messages sent from the control device 100, such as volume-key messages, digit-key messages, direction-key messages, or other CEC messages, etc.

In some embodiments, referring to aforementioned contents, the volume-key messages sent from the control device 100 to the display apparatus 200 are all stored in the initial message queue. Moreover, the initial message queue may store some other control messages during the volume-key messages being stored in the initial message queue. If the user presses and holds the volume key to adjust the volume, the control device 100 can also send multiple volume-key messages. If the volume-key messages are excessive, the volume-key messages in the initial message queue are also excessive, then the display apparatus 200 may be in a state of processing volume-key messages for a long time, and may not have much time to process other control messages in the initial message queue.

Moreover, if the display apparatus 200 directly processes all the volume-key messages, the volume of the display apparatus 200 may be changed suddenly.

Figure 14:
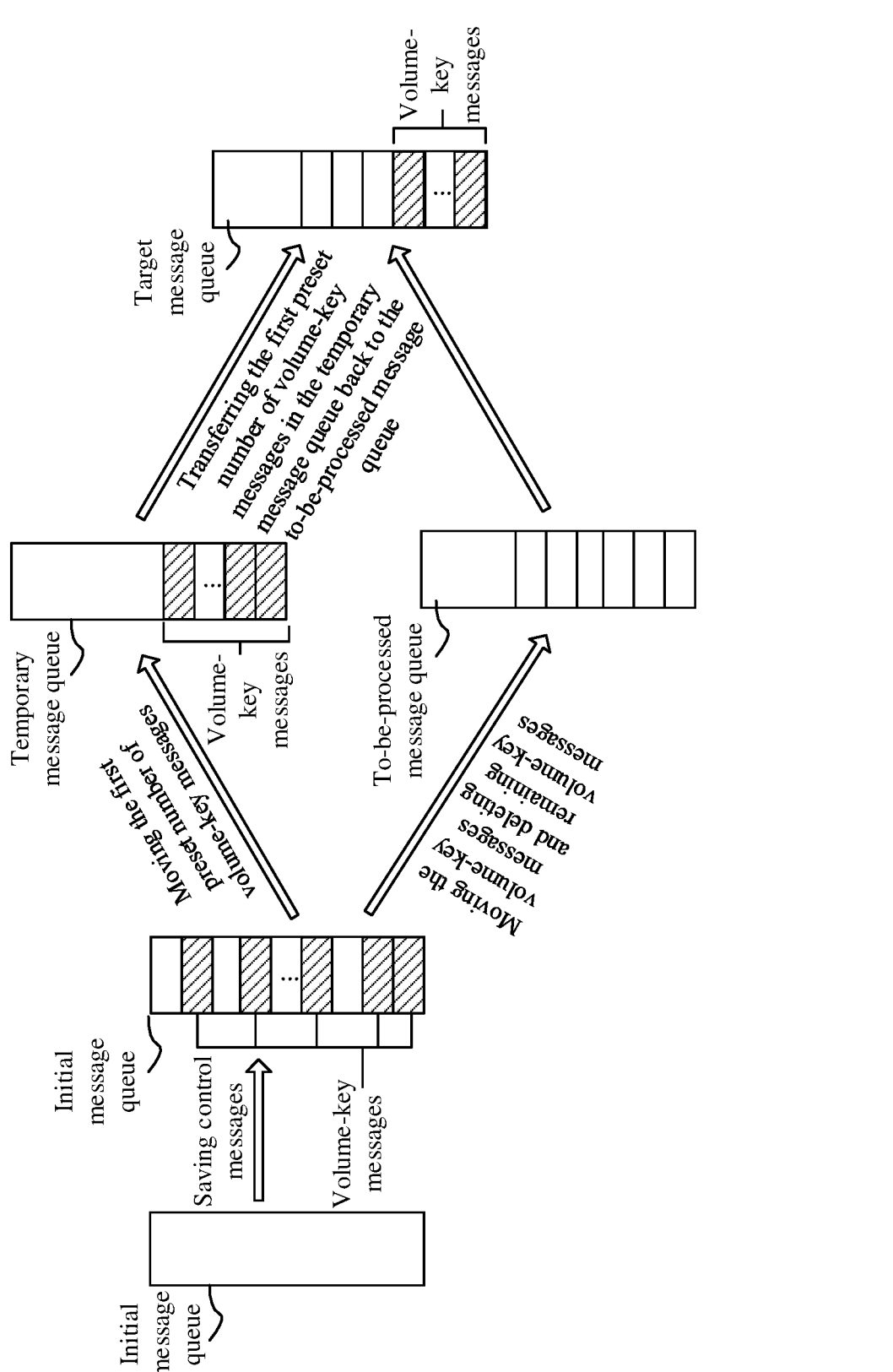
FIG. 14 is a first schematic diagram of processing volume-key messages in the display apparatus 200 according to some embodiments.

When the user presses and holds the volume key of the control device 100, in some embodiments, as shown in FIG. 14, in order to avoid causing the above problem to the display apparatus 200, the display apparatus 200 can also move the volume-key messages saved in the initial message queue within the preset time to the preset temporary message queue. During the movement, only the first preset number of volume-key messages are moved, and the reset of volume-key messages in the initial message queue can be discarded. In this case, the initial message queue is a to-be-processed message queue. Then, the target volume-key message set formed by the first preset number of volume-key messages in the temporary message queue are transferred to a tail of the to-be-processed message queue, and waits to be processed.

According to the above contents, the preset time can include at least one time unit. The number of retained volume-key messages within each time unit is the second preset number. The second preset number is determined according to a sending rate of volume-key messages from the control device 100. When moving the volume-key messages to the temporary message queue, the display apparatus 200 moves the second preset number of volume-key messages within each time unit out of the initial message queue. When the preset time only includes one time unit, the first preset number is equal to the second preset number. When the preset time includes at least two time units, the first preset number is the sum of second preset numbers of respective time units.

Figure 15:
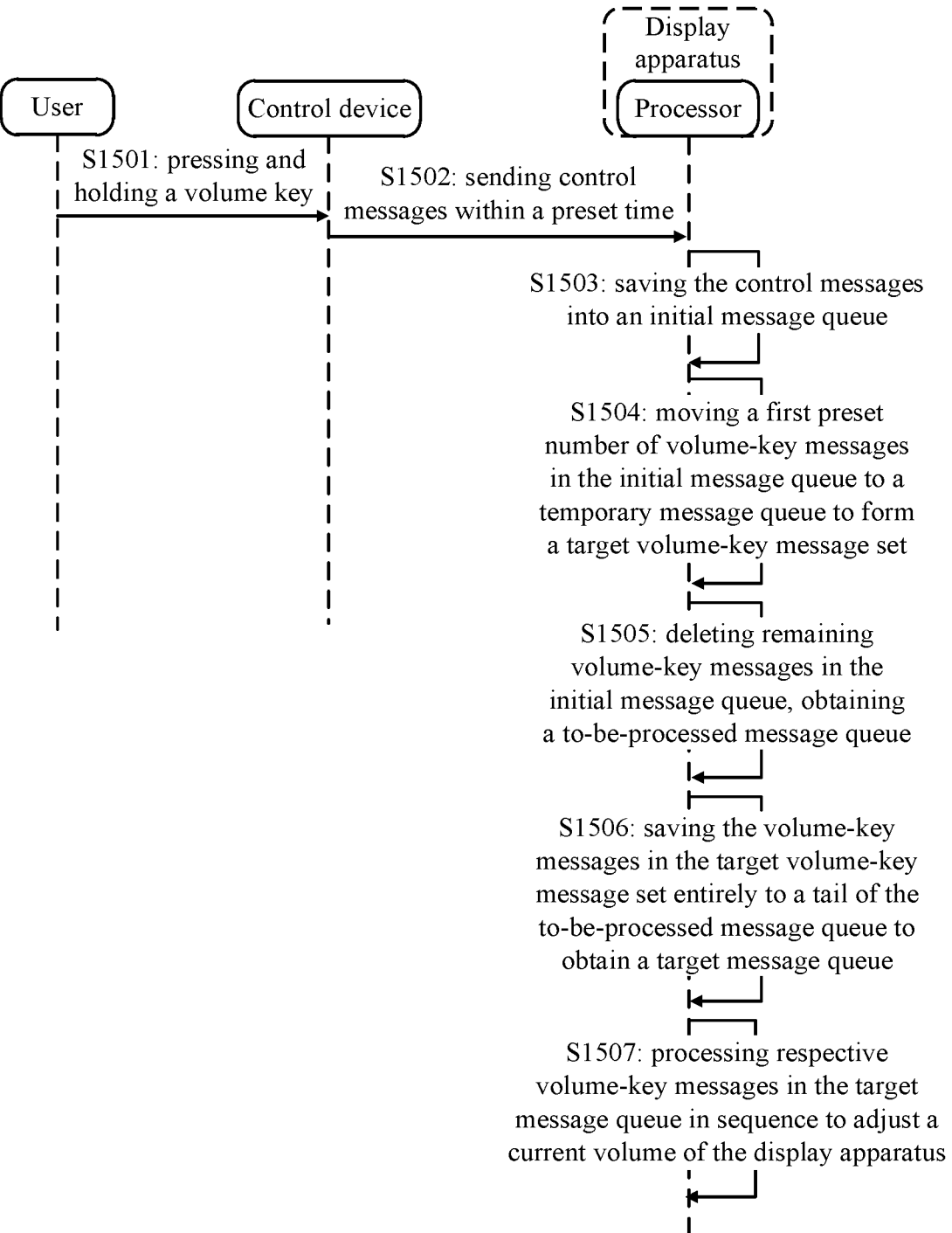
FIG. 15 is a second schematic diagram of processing volume-key messages in the display apparatus 200 according to some embodiments.

In some embodiments, as shown in FIG. 15, when the user presses and holds a volume key (S1501), the control device 100 needs to send control messages within a preset time to the display apparatus 200 (S1502), the processor 250 of the display apparatus 200 can be configured to: assign an initial message queue and a temporary message queue to the display apparatus 200 in advance, save all the control messages within the preset time to the initial message queue in sequence (S1503), then move a second preset number of volume-key messages within each time unit in the initial message queue to the temporary message queue to form a target volume-key message set (S1504), and delete the remaining volume-key messages within each time unit in the initial message queue to obtain a to-be-processed message queue (S1505), then save the volume-key messages in the target volume-key message set entirely to a tail of the to-be-processed message queue to obtain a target message queue (S1506), finally process respective volume-key messages in the target message queue in sequence so as to adjust a current volume of the display apparatus 200 (S1507).

The message queue is a First-In First-Out (FIFO) queue, the target volume-key message set should be saved in the tail of the to-be-processed message queue in order. Then, the display apparatus 200 processes respective control messages in queue order beginning with a control message in head of the queue.

The display apparatus 200 according to embodiments of the present disclosure can intercept and process some of the volume-key messages during a user pressing and holding the volume key to adjust a volume of the display apparatus 200 through the initial message queue and the temporary message queue, thereby avoid the volume of the display apparatus being changed suddenly caused by the display apparatus 200 processing excessive volume-key messages at a time, and avoid a problem such as not processing other control messages in time.

In general, the initial message queue saves key messages from control device in real time, that is, not only receiving volume-key messages corresponding to current pressing and holding volume key, but also receiving other control messages continuously sent from the control device 100. However, some embodiments of the present disclosure only select and process all control messages within a time of pressing and holding volume key, in order to avoid subsequent control messages affecting a process for the volume-key messages within the time of pressing and holding the volume key, that is, processing all control messages within the preset time, in other words, the initial message queue only saves the control messages within the preset time.

After then, the initial message queue becomes the to-be-processed message queue after the display apparatus 200 moving or deleting the volume-key messages in the initial message queue. The display apparatus 200 saves the target volume-key message set in the temporary message queue to the tail of the initial message queue.

From the user's point of view for operating the control device 100, pressing and holding the volume key once is namely adjusting the volume once. From the display apparatus 200 point of view, after receiving multiple volume-key messages generated by the pressing and hold the volume key once, the display apparatus 200 may integrally adjust the volume once after processing one volume-key message, or may adjust the volume once after processing several volume-key messages. If the volume adjustment mode of the display apparatus 200 is not defined, the volume change experienced actually by users may not match, but a sharp volume change. For example, the volume is first changed from 10 to 11, skipped from 11 to 14 and then from 14 to 15, etc.

Figure 16:
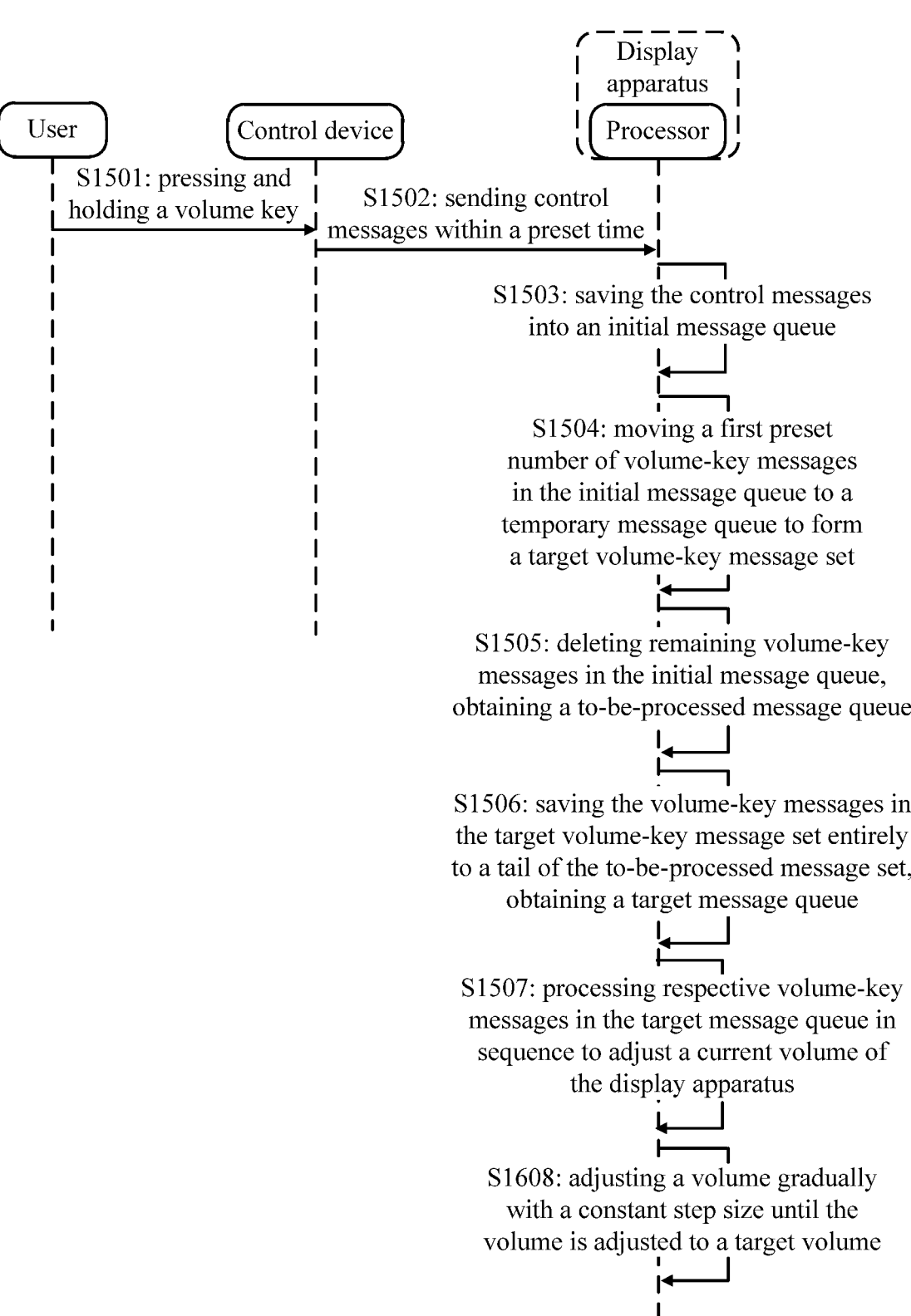
FIG. 16 is a third schematic diagram of processing volume-key messages in the display apparatus 200 according to some embodiments.

For this, in order to guarantee the volume adjustment of the display apparatus 200 to be changed smoothly, in some embodiments, as shown in FIG. 16, the display apparatus 200 needs to gradually adjust the volume with a constant step size until the volume is adjusted to the target volume (S1608). In some embodiments, the constant step size is determined by an attribute of a power amplifier of the display apparatus 200, for an example, the attribute defines a volume variable of the power amplifier corresponding to one volume-key message.

During this process, the processor 250 of the display apparatus 200 is configured to: process volume-key messages in the target volume-key message set in sequence, obtain a target volume for volume adjustment, then control a positioning control of a volume bar for displaying volume value in the display 260 to move gradually with a constant step size to a position of the target volume.

Figure 17:
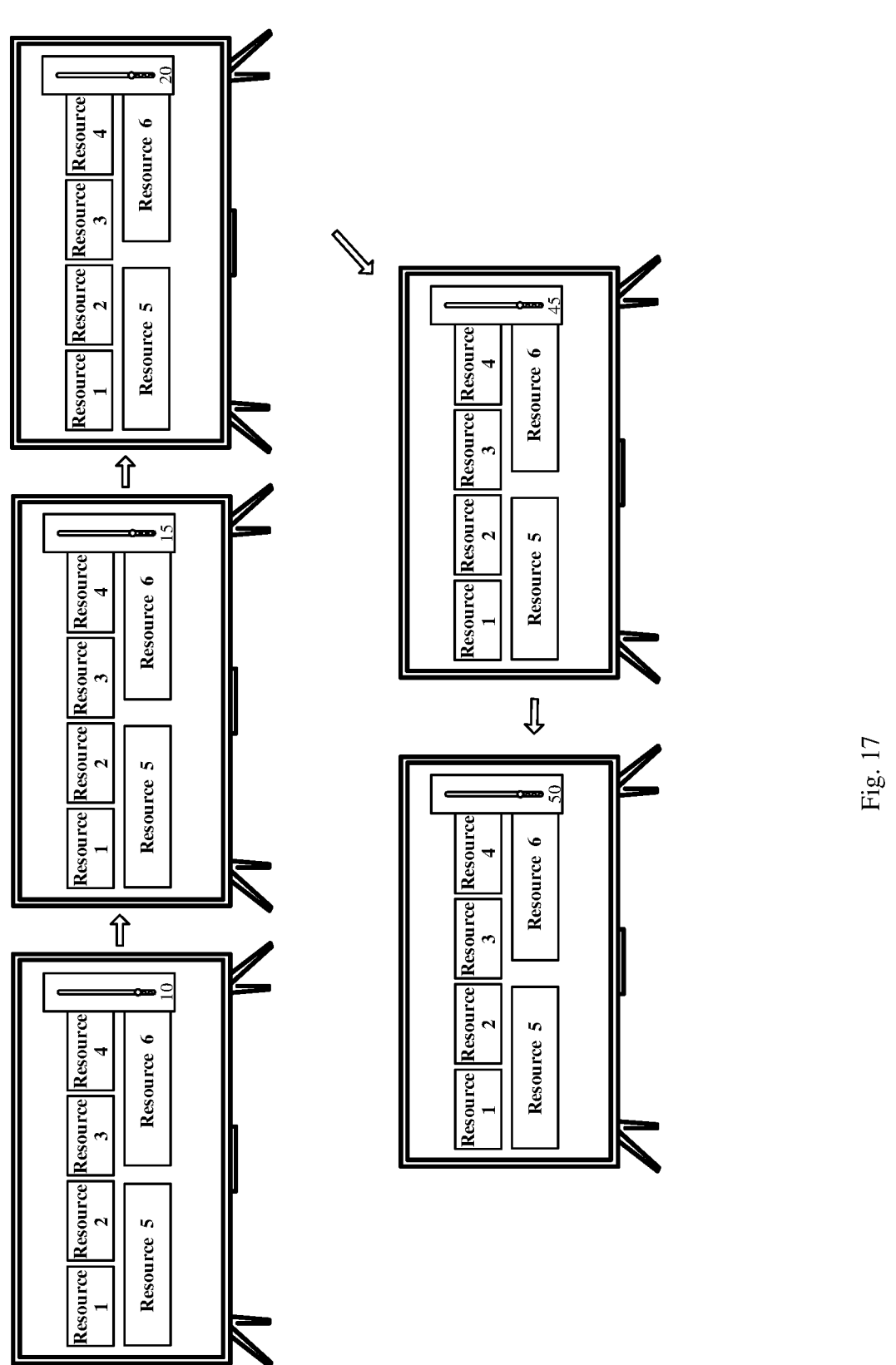
FIG. 17 is a schematic structural diagram of a volume bar according to some embodiments.

FIG. 17 shows a schematic diagram of a volume bar displayed according to some embodiments. As shown in FIG. 17, in some embodiments, if the display apparatus 200 obtains a target volume of 50 according to some of volume-key messages corresponding to the user operation of pressing and holding the volume key, and the positioning control of the volume bar of the display apparatus 200 is currently on a position of volume of 10, the display apparatus 200 can gradually move the positioning control with a constant step size of 5 to a position of volume of 15, a position of volume of 20, . . . a position of volume of 45 and a position of the volume of 50.

Further, in some embodiments, the display apparatus 200 can display a volume value corresponding to each halting position of the positioning control, such as the volume of 10, the volume of 15, the volume of 20 and etc., in order to make users directly see the volume change while hearing the volume change.

Figure 18:
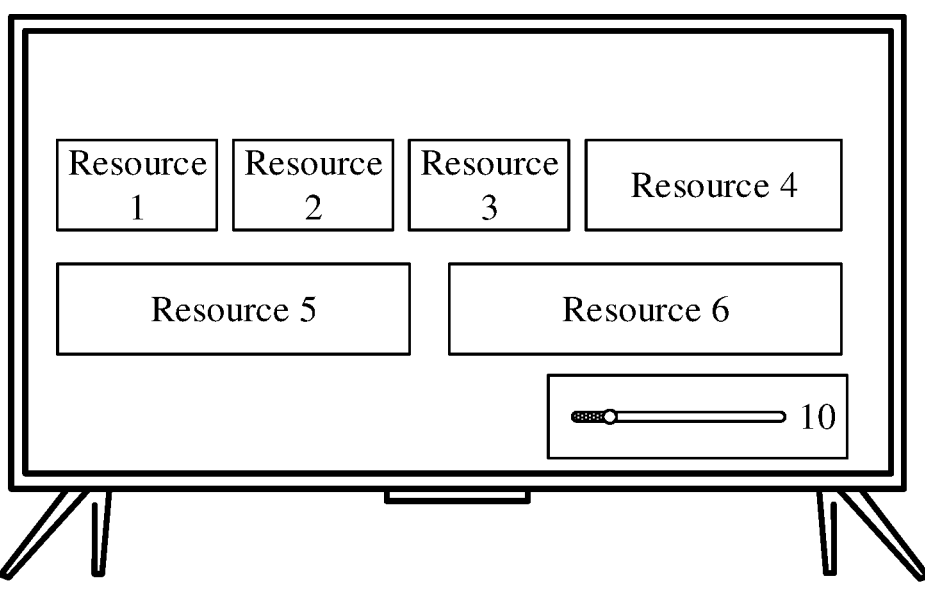
FIG. 18 is a schematic structural diagram of another volume bar according to some embodiments.

During this process, the processor 250 of the display apparatus 200 is further configured to control the display 260 to display a volume value corresponding to each halting position of the positioning control during the positioning control moving with the constant step size. The display position of the volume value can be below the volume bar, as shown in FIG. 17. Alternatively, if the volume bar is displayed horizontally on the display 250, the volume value can be also presented on left or right side of the volume bar, as shown in FIG. 18.

In some embodiments of the present disclosure, the initial message queue, the to-be-processed message queue and the target message queue are the same one message queue in essence, which is named more than once only for distinguishing different states of the message queue in the process.

As described above, the initial message queue is the one receiving control messages in real time. The display apparatus 200 intercepts and processes the volume-keys messages according to aforementioned ways after the user pressing and holding the volume key and saving multiple volume-key messages generated during the pressing and holding the volume key to the initial message queue. After the adjustment of the volume corresponding to the current pressing and holding operation, if the user presses and holds the volume key again after a few moments later, the display apparatus 200 can also intercept and process volume-keys messages within a next preset time according to aforementioned ways.

It should be noted that aforementioned embodiments only use the volume key '+' as an example to explain a process of volume change of the display apparatus 200. In some embodiments, the user can also press and hold a volume key '−' to operate, and the display apparatus 200 perform specific processing in a similar way.

Moreover, the control device 100 according to some embodiments of the present disclosure is not only the remote control, etc., but also a virtual remote control installed on a mobile terminal, such as a virtual remote control installed on a smart phone.

According to embodiments of the present disclosure, the display apparatus 200 can receive multiple volume-key messages generated by the user pressing and holding a volume-key of the control device 100 and other control messages sent from the control device 100, and the display apparatus can retain only some of the volume-key messages to process, so as to avoid processing excessive volume-key messages resulting in other control messages cannot be processed in time.

Further, in order to avoid the display apparatus 200 processing excessive volume-key messages, some embodiments of the present disclosure further provide a method for processing volume-key messages, which can be applied to aforementioned embodiments of the display apparatus 200. The method can include following steps: first, receiving all control messages sent from a control device 100 within a preset time, where the control messages include volume-key messages and one or more other control messages, and the preset time is used for indicating a time of a user pressing a volume key of the control device 100; then, retaining a first preset number of volume-key messages in all the control messages to form a target volume-key message set; finally, processing volume-key messages in the target volume-key message set in sequence, and adjusting a current volume of the display apparatus 200.

In some embodiments, the method further includes: assigning an initial message queue to the display apparatus 200 in advance; saving all the control messages within the preset time to the initial message queue in sequence, the preset time includes at least one time unit, and the initial message queue saves control messages received within each time unit.

In some embodiments, the method further includes: assigning a temporary message queue to the display apparatus 200 in advance; moving a second preset number of volume-key messages within each time unit in the initial message queue respectively to the temporary message queue in sequence to form the target volume-key message set; deleting remaining volume-key messages within each time unit in the initial message queue to obtain a to-be-processed message queue.

In some embodiments, the method further includes: saving the volume-key messages in the target volume-key message set entirely to a tail of the to-be-processed message queue to obtain a target message queue; processing respective volume-key messages in the target message queue in sequence, and adjusting the current volume of the display apparatus 200.

In some embodiments, the method further includes: processing the volume-key messages in the target volume-key message set in sequence, obtaining a target volume for volume adjustment; controlling a positioning control in a volume bar for displaying volume value in a display 260 to gradually move with a constant step size to a position of the target volume.

In some embodiments, the method further includes: controlling the display 260 to display a volume value corresponding to each halting position of the positioning control during the positioning control moving with the constant step size.

In some embodiments, the method further includes: detecting a sending rate of the control device sending the volume-key messages to the display apparatus 200 within the time unit; determining the second preset number of retained volume-key messages according to the sending rate.

The method for processing volume-key messages according to some embodiments of the present disclosure can be applied to the display apparatus 200 according to aforementioned embodiments, thus other contents concerning to the method for processing volume-key messages can refer to aforementioned embodiments of the display apparatus 200, and will not be repeated again herein.

In some scenarios, the display apparatus can be provided with multiple HDMI ports, and can be connected with external devices through the HDMI ports. The external device includes but not be limited to a set-top box, a DVD player and an audio play device. The audio play device includes an external power amplifier supporting a function of Audio Return Channel (ARC).

The HDMI supports a Consumer Electronics Control (CEC) communication protocol, and provides an advance control function to all external devices connected via the HDMI ports in a scenario, that is, a user can control devices connected with a CEC system through a remote control. All audio/video signal source devices in the CEC system are directly/indirectly connected with a root device, and form a tree from top to bottom through HDMI connection. The display apparatus acts as a root node of the tree, signal switch devices act as branch nodes of the tree, the external devices connected through the HDMI act as leaf nodes of the tree. Each device in the CEC system has a physical address, which is convenience for the CEC to address and control the device with a specific physical address. The display apparatus acting as the root node detects the number of devices currently connected via HDMI ports, and assigns physical addresses in the EDID to these devices, which is one of reasons why external power amplifier device becomes soundless.

For examples, after the external power amplifier 1 is inserted into the HDMI 1 of the display apparatus, the external power amplifier 1 reads EDID data of the HDMI 1, and parses a physical address assigned to the external power amplifier 1. The EDID version is updated continuously, whereas the existing external device may not be updated with the latest EDID version, or is not capable of supporting the latest EDID version, or not be updated in time. If the EDID version supported by the external power amplifier 1 is lower than the current EDID version of the HDMI 1, for an example, the external power amplifier 1 supports EDID 1.4, and the current EDID version of the HDMI 1 is EDID 2.1, then the external power amplifier cannot be compatible with the EDID 2.1, and cannot read data from the EDID 2.1 to parse and obtain an accurate physical address, thus reports a wrong physical address, resulting in the external power amplifier 1 being soundless.

To address the external audio play device being soundless caused by being incompatible with higher EDID version, the present disclosure provides a method for controlling HDMI port, aiming to determine whether it is necessary to switch the version of the EDID according to the device type of a device connected via the HDMI port, adjusting the version of the EDID to adapt to the capability of the external audio device, so as to accurately parse the EDID data and output sound that is valid and satisfies output volume settings.

In some embodiments, in response to detecting that the HDMI port is connected with the external device, the display apparatus detects the device type of the external device. If the device type is an audio play device, the display apparatus makes the current EDID version of the HDMI port be a preset version. The preset version is a basic version supported by general external audio play devices, for an example, the preset version is EDID 1.4.

In some embodiments, the display apparatus further detects the current version of the EDID of the HDMI port after detecting that the device type is an audio play device. If the current version of the EDID is higher than the preset version, the current version of the EDID of the HDMI port is switched to the preset version. For an example, the preset version is EDID 1.4, the current version of the EDID of the HDMI port is EDID 2.0, this may cause a problem of soundless due to the lower EDID version of the audio play device, so the EDID version of the HDMI port is controlled to be switched, such as be lowered to EDID 1.4 from the EDID 2.0.

In some embodiments, the display apparatus further detects the current version of the EDID of the HDMI port after detecting that the device type is an audio play device. If the current version of the EDID is the preset version, there is no need to switch the version of the EDID, that is, the version of the EDID of the HDMI port is kept as the preset version.

In some embodiments, in response to detecting that the device type is not an audio play device, such as a video signal source device and etc., there is no need to switch the version of the EDID, that is, the current version of EDID is kept unchanged no matter the current version of the EDID is the preset version or higher than the preset version.

Figure 19:
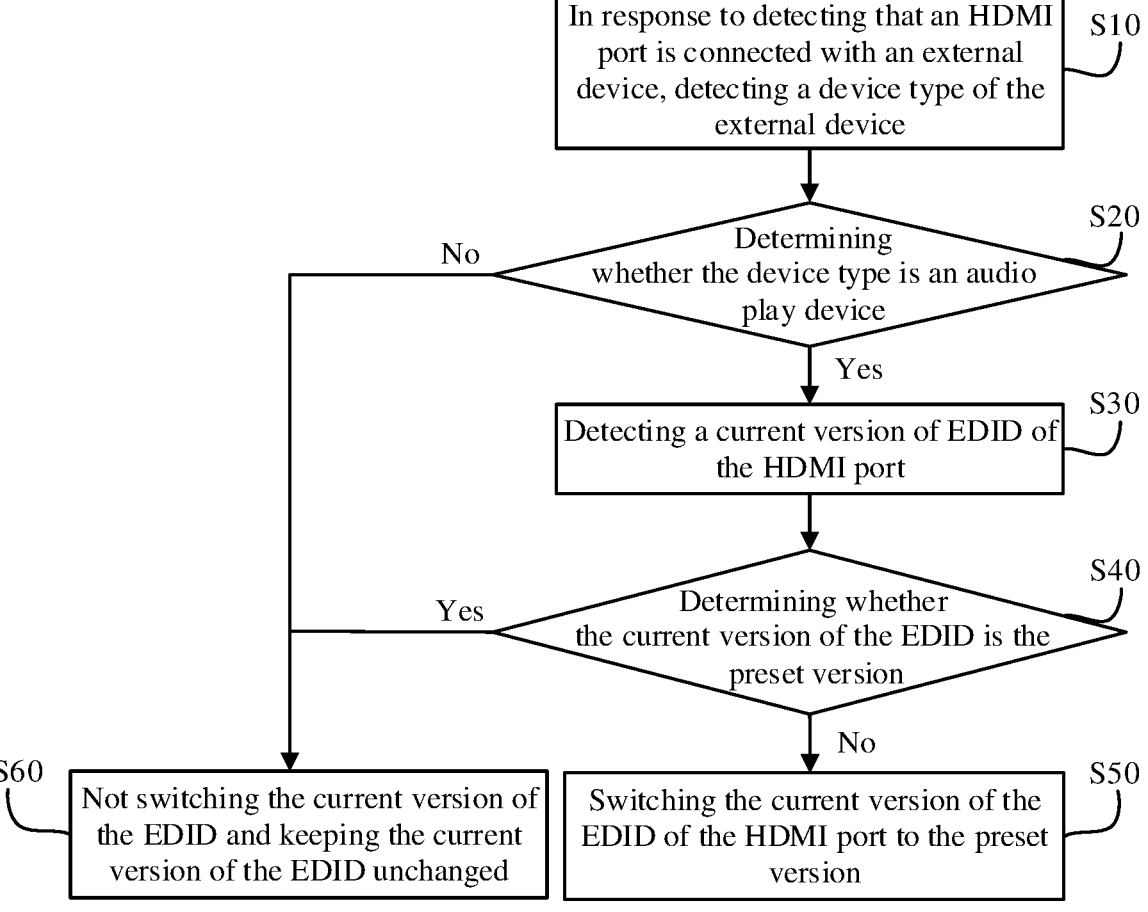
FIG. 19 is a flow chart of a method for controlling an HDMI port.

In some embodiments, FIG. 19 shows the method for controlling an HDMI port. The method is implemented by a processor, and includes following steps.

Step S10: in response to detecting that an HDMI port is connected with an external device, detecting a device type of the external device.

In some embodiments, each device connected with the CEC control BUS includes a unique logic address which also acts as a unique identifier of the device, thus the device type of the external device can be identified according to the logic address.

Alternatively, the display apparatus can maintain a list of logic addresses of devices. The list records a corresponding relationship between each device connected with the CEC control BUS and its logic address. For this, after obtaining the logic address of the external device, the external device can be found by searching the list according to the logic address, thereby obtaining the specific device type of the external device. Table 1 below shows a list of logic addresses of devices.

TABLE 1

| Logic address | Device |
| --- | --- |
| 0 | Display apparatus/TV |
| 1 | Recording device 1 (e.g. VCR) |

TABLE 1-continued

| Logic address | Device |
|---|---|
| 2 | Recording device 2 |
| 3 | Tuner 1 |
| 4 | Playback device 1 (e.g. DVD) |
| 5 | Audio play device |
| 6 | Tuner 2 |
| 7 | Tuner 3 |
| 8 | Playback device 2 |
| 9 | Recording device 3 |
| 10 | Tuner 4 |
| 11 | Playback device 3 |
| 12 | Reserved |
| 13 | Reserved |
| 14 | Undefined, any device |
| 15 | Unregistered (as an address of an initiating device); Broadcast (as an address of a target device) |

In an embodiment, as shown in Table 1, the logic address of a display apparatus as a root node is set to be 0 in default. After a device A is connected with an HDMI port, a logic address can be preset for the device since the device type of the device A is known, for an example, a logic address preset for a DVD acting as a playback device 1 is 4, and the logic address of the device A is broadcast through <Polling Message>. If the logic address set for the device A is occupied by the device B, the device B will respond with an acknowledgement message. The device A resets the logic address after receiving the acknowledgement message, and broadcasts <Polling Message> until no any device responds with an acknowledgement message. In this case, the currently set logic address is available, the device A is determined to occupy this logic address, and a corresponding relationship between the device A and the logic address occupied by the device A is inserted into the list of logic addresses of devices. After occupying the logic address, the device A sends a broadcast message <Report Physical Address> including the physical address of the device A and the logic address of the device A, so as to broadcast a logic-address occupation statement. If the preset logic addresses are all occupied by other devices after traversing and querying, the logic address of the device A will be set to be 15.

In some embodiments, when the external device is connected with the HDMI port, the external device can send a broadcast message including a logic address of the external device. The external device can be positioned through the logic address. For an example, if the logic address 5 of the external device is obtained, the list of logic addresses of devices is queried to obtain a device corresponding to the logic address 5 being an audio play device, so the audio play device can act as a target object of which the EDID version is adjustable.

Step S20: determining whether the device type is an audio play device, if the device type is the audio play device, flowing to Step S30, and if the device type is not an audio play device, flowing to Step S60.

Step S30: detecting a current version of EDID of the HDMI port; the current version of the EDID is generally not lower than the preset version.

Step S40: determining whether the current version of the EDID is the preset version, if the current version of the EDID is higher than the preset version, flowing to Step S50, if the current version of the EDID is the preset version, flowing to Step S60.

Step S50: switching the current version of the EDID of the HDMI port to the preset version.

Step S60: not switching the current version of the EDID and keeping the current version of the EDID unchanged.

According to the above embodiments, in response to detecting that the HDMI port is connected with an external device, first detecting a device type of the external device, and determining whether it is necessary to switch an EDID version of the HDMI port according to the device type; in response to detecting that an audio play device is connected with the HDMI port, setting the EDID version of the HDMI port to be a preset version, the preset version is a preset basic version which can be supported by an external audio play device, such as EDID 1.4, so that the external audio play device can accurately identify and parse information of the EDID, and is guaranteed to play sound that is valid and satisfies output volume settings, thereby avoiding problems such as soundless due to the external audio play device being incompatible with higher version of the EDID. If the device type is a video signal source device, or the device type is an audio play device and the current version of the EDID is the preset version, it is unnecessary to switch the current version of the EDID, that is, keeping the current version unchanged. This state can still guarantee that the audio signal and video signal can be played properly. In a scenario, adaptive process logics can be performed automatically according to the device type of the external device connected with the HDMI port and the current EDID version of the HDMI port, thereby solving a compatible problem between the external device and an enhanced version above 2.0 of the EDID, guaranteeing audio play data to output sound properly, and improving the user experience without manually adjusting the EDID version.

It should be noted that aforementioned embodiments are merely used for describing schemes of the present disclosure, but not for limiting the present disclosure. Although embodiments of the present disclosure have been described, those skilled in the art can make additional changes and modifications to these embodiments or make an equivalent replacement to some/all technical elements.

What is claimed is:

1. A display apparatus, comprising:
   a display configured to present an image and/or a user interface;
   one or more HDMI ports, configured to connect with one or more external devices, wherein the one or more external devices comprise an external power amplifier, an audio output channel of the external power amplifier comprises an Audio Return Channel, ARC and/or an enhanced Audio Return Channel, eARC;
   a sound speaker configured to play audio;
   a memory configured to store instructions and data associated with the display;
   at least one processor in connection with the display, the one or more HDMI ports, the sound speaker and configured to execute the instructions to cause the display apparatus to perform:
   in response to a switch operation for switching the audio output channel of the external power amplifier, obtaining a first state value corresponding to the switch operation, wherein the first state value is used for indicating an ON/OFF state of the eARC specified by the switch operation;
   adjusting a connection state of the ARC and a connection state of the eARC according to the first state value, and determining a target channel for outputting audio according to an adjusting result, and displaying the ON/OFF state of the eARC matching with the target channel;

wherein the at least one processor is configured to execute the instructions to cause the display apparatus to perform:

in response to the switch operation being for switching the eARC from the OFF state to the ON state, recording the first state value as 'on';

in response to the switch operation being for switching the eARC from the ON state to the OFF state, recording the first state value as 'off';

in response to the first state value being detected as 'on', causing a driver layer to connect with eARC channel and disconnect with ARC channel;

generating a second state value according to an adjusting result of the driver layer, and reporting the second state value to a framework layer of the display apparatus so as to cause the framework layer to implement a channel-switch control logic, wherein the second state value is used for indicating a connection state of the eARC;

wherein the channel-switch control logic is configured to:

in response to the second state value being detected as 'on', determine that the target channel is the eARC channel and control the display to change a switch control of the eARC to be the ON state;

in response to the second state value being detected as 'off', determining that the target channel is the ARC channel, reestablishing a connection with the ARC channel, and controlling the display to set the switch control of the eARC as the OFF state;

wherein in response to eARC connection failure, eARC connection timeout, or detecting that the external power amplifier does not support the eARC while connecting with the eARC, the second state value is set to 'off'.

2. The display apparatus according to claim 1, wherein the at least one processor is configured to execute the instructions to cause the display apparatus to perform:

in response to the first state value being detected as 'off', causing a driver layer to disconnect with eARC channel, generating a second state value and reporting the second state value to a framework layer of the display apparatus so as to cause the framework layer to implement a channel-switch control logic;

wherein the channel-switch control logic is configured to:

in response to the second state value being detected as 'off', determine that the target channel is the ARC channel, reestablish a connection with the ARC channel, and control the display to change a switch control of the eARC to be the OFF state.

3. The display apparatus according to claim 1, wherein the at least one processor is configured to execute the instructions to cause the display apparatus to perform:

monitoring an ON/OFF state of a Consumer Electronics Control, CEC, function;

in response to the CEC function being switched from the ON state to the OFF state, searching a current audio output channel;

in response to the current audio output channel being the eARC channel, keeping the current audio output channel unchanged.

4. The display apparatus according to claim 3, wherein the at least one processor is configured to execute the instructions to cause the display apparatus to perform:

controlling the display to present a first prompt message, the first prompt message is used for indicating that the CEC function is OFF, and it is unable to use a remote control to adjust volume of audio output from the eARC channel.

5. The display apparatus according to claim 3, wherein the at least one processor is configured to execute the instructions to cause the display apparatus to perform:

in response to the CEC function being switched from the ON state to the OFF state, and the current audio output channel being the ARC, sending an exit instruction to the external power amplifier, switching the audio output channel to the sound speaker of the display apparatus, and controlling the display to present a second prompt message for indicating that the CEC function is OFF and the audio output channel is automatically switched to the sound speaker; the exit instruction is used for instructing the external power amplifier to exit from ARC work mode.

6. The display apparatus according to claim 1, wherein the at least one processor is configured to execute the instructions to cause the display apparatus to perform:

in response to a CEC function being in an OFF state, controlling the external power amplifier on a setting page of audio output to be in a selectable state;

in response to the external power amplifier being in the selectable state, receiving further adjustment for the ON/OFF state of the eARC from a user.

7. A switching method for an audio output channel in a display apparatus, comprising:

in response to a switch operation for switching the audio output channel of an external power amplifier, obtaining a first state value corresponding to the switch operation, wherein the external power amplifier is connected with the display apparatus through a High-Definition Multimedia Interface, HDMI, the audio output channel of the external power amplifier comprises: an Audio Return Channel, ARC and/or an enhanced Audio Return Channel, eARC, the first state value is used for indicating an ON/OFF state of the eARC specified by the switch operation;

adjusting a connection state of the ARC and a connection state of the eARC according to the first state value, and determining a target channel for outputting audio according to an adjusting result, and displaying the ON/OFF state of the eARC matching with the target channel;

wherein the method further comprises:

in response to the switch operation being for switching the eARC from the OFF state to the ON state, recording the first state value as 'on';

in response to the switch operation being for switching the eARC from the ON state to the OFF state, recording the first state value as 'off';

in response to the first state value being detected as 'on', causing a driver layer to connect with eARC channel and disconnect with ARC channel;

generating a second state value according to an adjusting result of the driver layer, and reporting the second state value to a framework layer of the display apparatus so as to cause the framework layer to implement a channel-switch control logic, wherein the second state value is used for indicating a connection state of the eARC;

wherein the channel-switch control logic is configured to:

in response to the second state value being detected as 'on', determine that the target channel is the eARC channel and control a display of the display apparatus to change a switch control of the eARC to be the ON state;

in response to the second state value being detected as 'off', determining that the target channel is the ARC channel, reestablishing a connection with the ARC channel, and controlling the display to set the switch control of the eARC as the OFF state;

wherein in response to eARC connection failure, eARC connection timeout, or detecting that the external power amplifier does not support the eARC while connecting with the eARC, the second state value is set to 'off'.

8. The method according to claim 7, wherein the method further comprises:

in response to the first state value being detected as 'off', causing a driver layer to disconnect with eARC channel, generating a second state value and reporting the second state value to a framework layer of the display apparatus so as to cause the framework layer to implement a channel-switch control logic;

wherein the channel-switch control logic is configured to: in response to the second state value being detected as 'off', determine that the target channel is the ARC channel, reestablish a connection with the ARC channel, and control a display of the display apparatus to change a switch control of the eARC to be the OFF state.

9. The method according to claim 7, wherein the method further comprises:

monitoring an ON/OFF state of a Consumer Electronics Control, CEC, function;

in response to the CEC function being switched from the ON state to the OFF state, searching a current audio output channel;

in response to the current audio output channel being the eARC channel, keeping the current audio output channel unchanged.

10. The method according to claim 9, wherein the method further comprises:

controlling a display of the display apparatus to present a first prompt message, the first prompt message is used for indicating that the CEC function is OFF, and it is unable to use a remote control to adjust volume of audio output from the eARC channel.

11. The method according to claim 9, wherein the method further comprises:

in response to the CEC function being switched from the ON state to the OFF state, and the current audio output channel being the ARC, sending an exit instruction to the external power amplifier, switching the audio output channel to a sound speaker of the display apparatus, and controlling a display of the display apparatus to present a second prompt message for indicating that the CEC function is OFF and the audio output channel is automatically switched to the sound speaker; the exit instruction is used for instructing the external power amplifier to exit from ARC work mode.

12. The method according to claim 7, wherein the method further comprises:

in response to a CEC function being in an OFF state, controlling the external power amplifier on a setting page of audio output to be in a selectable state;

in response to the external power amplifier being in the selectable state, receiving further adjustment for the ON/OFF state of the eARC from a user.

* * * * *